US012574098B2

(12) United States Patent
Gulati et al.

(10) Patent No.: US 12,574,098 B2
(45) Date of Patent: Mar. 10, 2026

(54) RECEIVE SPATIAL CONFIGURATION INDICATION FOR COMMUNICATION BETWEEN WIRELESS DEVICES

(71) Applicant: QUALCOMM Incorporated, San Diego, CA (US)

(72) Inventors: Kapil Gulati, Belle Mead, NJ (US); Navid Abedini, Basking Ridge, NJ (US); Junyi Li, Fairless Hills, PA (US); Sourjya Dutta, San Diego, CA (US); Shuanshuan Wu, San Diego, CA (US); Anantharaman Balasubramanian, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/252,021

(22) PCT Filed: Jan. 7, 2021

(86) PCT No.: PCT/CN2021/070670
§ 371 (c)(1),
(2) Date: May 5, 2023

(87) PCT Pub. No.: WO2022/147718
PCT Pub. Date: Jul. 14, 2022

(65) Prior Publication Data
US 2024/0015527 A1 Jan. 11, 2024

(51) Int. Cl.
*H04B 7/06* (2006.01)
*H04B 17/318* (2015.01)
*H04W 16/28* (2009.01)

(52) U.S. Cl.
CPC ....... *H04B 7/06968* (2023.05); *H04B 17/328* (2023.05); *H04W 16/28* (2013.01)

(58) Field of Classification Search
CPC ............. H04B 7/06968; H04B 17/328; H04B 7/0665; H04B 7/06952; H04B 7/06962; H04B 7/06966; H04B 7/088; H04W 16/28
See application file for complete search history.

(56) References Cited

U.S. PATENT DOCUMENTS 8,078,110 B2 * 12/2011 Li ......................... H04B 7/086
375/267
2020/0068422 A1 * 2/2020 Wang ................... H04B 7/0456
(Continued)

FOREIGN PATENT DOCUMENTS

CN        109155656 A     1/2019
CN        109983820 A     7/2019
(Continued)

OTHER PUBLICATIONS

Apple Inc: "Discussion on Beam Measurement and Reporting", 3GPP TSG RAN WG1 Meeting #92bis, R1-1804770, 3rd Generation Partnership Project (3GPP), Mobile Competence Centre, 650, Route Des Lucioles, F-06921 Sophia-Antipolis Cedex, FR, vol. RAN WG1, No. Sanya, China, Apr. 16, 2018-Apr. 20, 2018, Apr. 15, 2018, XP051427037, 8 pages, Chapter 1, "Introduction, Chapter 2, UE Event Based Aperiodic Beam Measurement Reporting".
(Continued)

*Primary Examiner* — Ivan O Latorre
(74) *Attorney, Agent, or Firm* — QUALCOMM Incorporated

(57) ABSTRACT

According to some aspects, a wireless device may indicate to another device a receive configuration indicator (RCI) to indicate a receive spatial configuration of the wireless device. For example, a first device may configure the first device to receive, from a second device, a signal using a first receive spatial configuration of the first device that corresponds to a first transmit spatial configuration of the second device. The first device may further determine a RCI to
(Continued)

indicate the first receive spatial configuration of the first device, and may transmit the RCI to the second device.

30 Claims, 15 Drawing Sheets

(56) References Cited

U.S. PATENT DOCUMENTS

| | | | | | |
|---|---|---|---|---|---|
| 2020/0163073 | A1* | 5/2020 | Li | | H04B 7/0695 |
| 2020/0195324 | A1* | 6/2020 | Grant | | H04L 5/0051 |
| 2021/0045103 | A1* | 2/2021 | Kim | | H04W 4/70 |
| 2021/0135830 | A1* | 5/2021 | Yu | | H04B 7/06966 |
| 2021/0184812 | A1* | 6/2021 | MolavianJazi | | H04L 1/0041 |
| 2021/0352758 | A1* | 11/2021 | Dutta | | H04W 76/28 |
| 2021/0360603 | A1* | 11/2021 | Wang | | H04L 5/0048 |
| 2021/0385668 | A1* | 12/2021 | Kang | | H04W 72/1263 |
| 2022/0007403 | A1* | 1/2022 | Li | | H04W 72/20 |
| 2022/0015118 | A1* | 1/2022 | Park | | H04B 7/0408 |
| 2022/0116979 | A1* | 4/2022 | Park | | H04L 5/0053 |
| 2022/0166468 | A1* | 5/2022 | Go | | H04B 7/06956 |
| 2022/0361007 | A1* | 11/2022 | Cui | | H04W 74/0833 |
| 2023/0036146 | A1* | 2/2023 | Xue | | H04W 72/25 |
| 2023/0140393 | A1* | 5/2023 | Guo | | H04B 7/0617 |
| | | | | | 370/329 |
| 2023/0148234 | A1* | 5/2023 | Dutta | | H04W 72/40 |
| | | | | | 370/329 |
| 2023/0275631 | A1* | 8/2023 | Abdelghaffar | | H04B 7/0691 |
| | | | | | 375/267 |
| 2024/0015527 | A1* | 1/2024 | Gulati | | H04B 7/06968 |
| 2024/0015771 | A1* | 1/2024 | Guo | | H04W 72/541 |
| 2024/0049252 | A1* | 2/2024 | Gulati | | H04B 17/309 |
| 2024/0080115 | A1* | 3/2024 | Guo | | H04B 7/06954 |
| 2024/0098526 | A1* | 3/2024 | Matsumura | | H04L 5/0023 |
| 2024/0121069 | A1* | 4/2024 | Guo | | H04W 16/14 |
| 2024/0137176 | A1* | 4/2024 | Matsumura | | H04L 5/0023 |
| 2024/0137754 | A1* | 4/2024 | Balasubramanian | | H04W 8/22 |
| 2024/0421876 | A1* | 12/2024 | Deng | | H04W 72/25 |

FOREIGN PATENT DOCUMENTS

| | | |
|---|---|---|
| CN | 110140300 A | 8/2019 |
| CN | 111328442 A | 6/2020 |
| WO | 2009009539 | 1/2009 |
| WO | 2018085709 A1 | 5/2018 |
| WO | 2019182341 A1 | 9/2019 |

OTHER PUBLICATIONS

Ericsson: "On Beam Indication, Measurement and Reporting", 3GPP TSG-RAN WG1 #90bis, R1-1718433, on Beam Indication, Measurement and Reporting, 3rd Generation Partnership Project, Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017, XP051341615, Oct. 3, 2017, 9 Pages.
International Search Report and Written Opinion—PCT/CN2021/070670—ISA/EPO—Sep. 23, 2021.
Supplementary European Search Report—EP21916776—Search Authority—Munich—Nov. 4, 2024.

* cited by examiner 602
608a
608b
608c
608d
608e
608f
608g
606a
606b
606c
606d
606e
606f
606g
606h
604
600
FIG. 6

1100

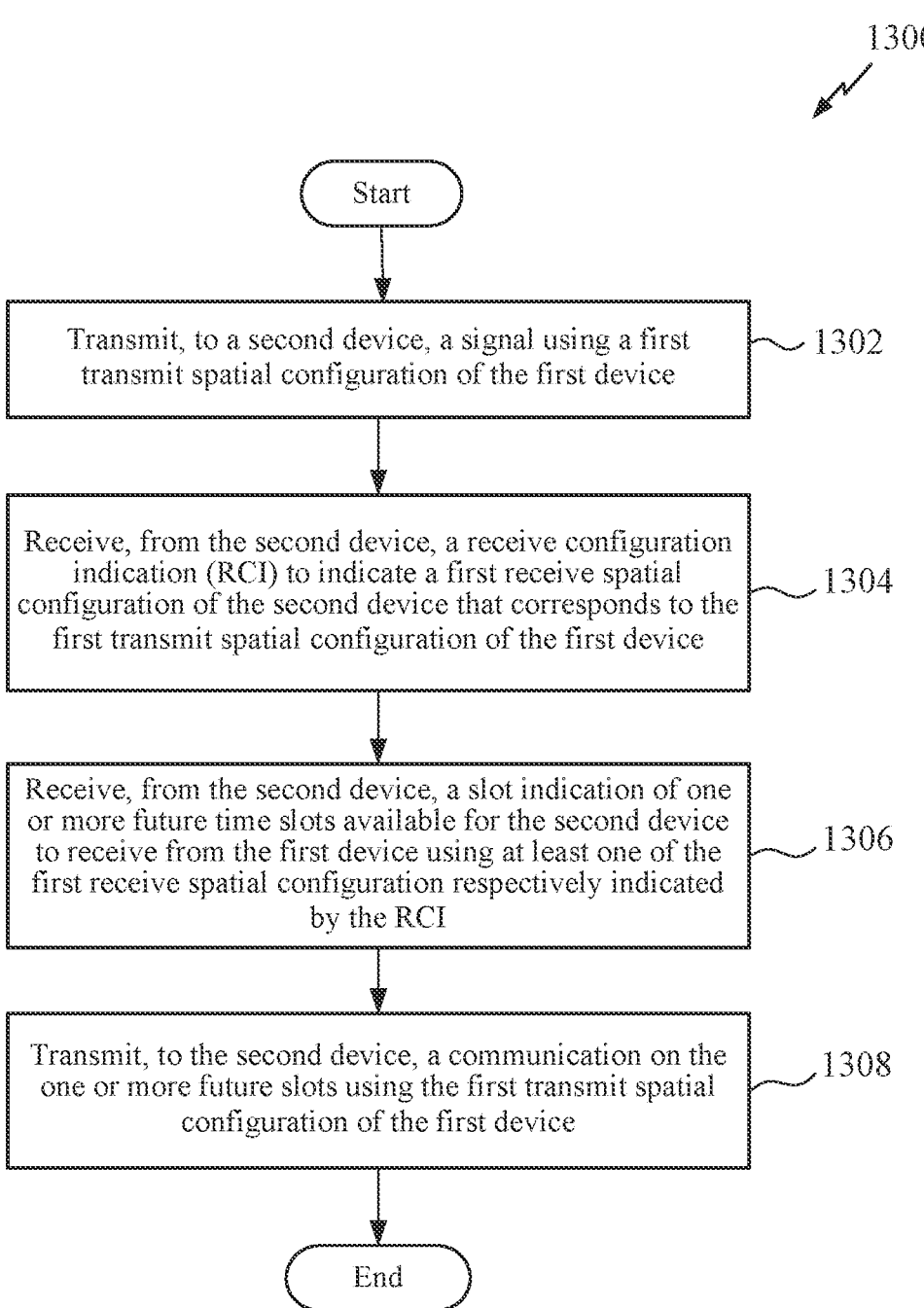

1300

Start

Transmit, to a second device, a signal using a first transmit spatial configuration of the first device ~ 1302

Receive, from the second device, a receive configuration indication (RCI) to indicate a first receive spatial configuration of the second device that corresponds to the first transmit spatial configuration of the first device ~ 1304

Receive, from the second device, a slot indication of one or more future time slots available for the second device to receive from the first device using at least one of the first receive spatial configuration respectively indicated by the RCI ~ 1306

Transmit, to the second device, a communication on the one or more future slots using the first transmit spatial configuration of the first device ~ 1308

End

FIG. 13

RECEIVE SPATIAL CONFIGURATION INDICATION FOR COMMUNICATION BETWEEN WIRELESS DEVICES

CROSS-REFERENCE TO RELATED APPLICATION(S)

This application is the U.S. national stage of PCT patent application number PCT/CN2021/070670 filed on Jan. 7, 2021.

TECHNICAL FIELD

The technology discussed below relates generally to wireless communication systems, and more particularly, to indication of a spatial configuration of a wireless device.

INTRODUCTION

In wireless communication systems, such as those specified under standards for 5G New Radio (NR), a base station and user equipment (UE) may utilize beamforming for spatial division multiplexing of multiple streams from the base station to the UE. To facilitate beamformed multi-stream communication, the base station may provide the UE with a set of transmission configuration indicator (TCI) states. Each TCI state may include quasi co-location (QCL) information indicating one or more downlink reference signals from which various radio channel properties of downlink channels or downlink signals may be inferred. An example of QCL information includes QCL-TypeD, which indicates a spatial property of a beam (e.g., a beam direction and/or beam width) associated with a particular downlink reference signal. From the QCL-TypeD information, the UE may infer the beam on which a downlink channel or downlink signal may be communicated. Hence, the base station may indicate the beam of the base station used for a downlink communication via a TCI state. Beamforming features and/or beam management procedures may also be implemented for wireless communication between peer devices, for example, between UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a first device is disclosed. The method includes configuring the first device to receive, from a second device, a signal using a first receive spatial configuration of the first device that corresponds to a first transmit spatial configuration of the second device, determine a receive configuration indicator (RCI) to indicate the first receive spatial configuration of the first device, and transmitting the RCI to the second device.

In another example, a first device for wireless communication is disclosed. The UE includes at least one processor, a transceiver communicatively coupled to the at least one processor, and a memory communicatively coupled to the at least one processor. The at least one processor may be configured to configure the first device to receive, from a second device, a signal using a first receive spatial configuration of the first device that corresponds to a first transmit spatial configuration of the second device, determine a receive configuration indicator (RCI) to indicate the first receive spatial configuration of the first device, and transmit the RCI to the second device.

In another example, a non-transitory processor-readable storage medium having instructions for a first device thereon may be disclosed. The instructions, when executed by a processing circuit, cause the processing circuit to configure the first device to receive, from a second device, a signal using a first receive spatial configuration of the first device that corresponds to a first transmit spatial configuration of the second device, determine a receive configuration indicator (RCI) to indicate the first receive spatial configuration of the first device, and transmit the RCI to the second device.

In a further example, a first device for wireless communication may be disclosed. The UE includes means for configuring the first device to receive, from a second device, a signal using a first receive spatial configuration of the first device that corresponds to a first transmit spatial configuration of the second device, means for determine a receive configuration indicator (RCI) to indicate the first receive spatial configuration of the first device, and means for transmitting the RCI to the second device In one example, a method of wireless communication by a first device is disclosed. The method includes transmitting, to a second device, a signal using a first transmit spatial configuration of the first device, receiving, from the second device, a first receive configuration indication (RCI) to indicate a first receive spatial configuration of the second device that corresponds to the first transmit spatial configuration of the first device, receiving, from the second device, a slot indication of one or more future time slots available for the second device to receive from the first device using at least one of the first receive spatial configuration respectively indicated by the RCI, and transmitting, to the second device, a communication on the one or more future slots using the first transmit spatial configuration of the first device.

In another example, a first device for wireless communication is disclosed. The base station includes at least one processor, a transceiver communicatively coupled to the at least one processor, and a memory communicatively coupled to the at least one processor. The at least one processor may be configured to transmit, to a second device, a signal using a first transmit spatial configuration of the first device, receive, from the second device, a receive configuration indications (RCI) to indicate a first receive spatial configuration of the second device that corresponds to the first transmit spatial configuration of the first device, receive, from the second device, a slot indication of one or more future time slots available for the second device to receive from the first device using at least one of the first receive spatial configuration respectively indicated by the RCI, and transmit, to the second device, a communication on the one or more future slots using the first transmit spatial configuration of the first device.

In another example, a non-transitory processor-readable storage medium having instructions for a first device thereon may be disclosed. The instructions, when executed by a processing circuit, cause the processing circuit to transmit, to a second device, a signal using a first transmit spatial configuration of the first device, receive, from the second device, a receive configuration indications (RCI) to indicate a first receive spatial configuration of the second device that corresponds to the first transmit spatial configuration of the first device, receive, from the second device, a slot indication of one or more future time slots available for the second device to receive from the first device using at least one of the first receive spatial configuration respectively indicated by the RCI, and transmit, to the second device, a communication on the one or more future slots using the first transmit spatial configuration of the first device.

In a further example, a first device for wireless communication may be disclosed. The base station includes means for transmitting, to a second device, a signal using a first transmit spatial configuration of the first device, means for receiving, from the second device, a receive configuration indications (RCI) to indicate a first receive spatial configuration of the second device that corresponds to the first transmit spatial configuration of the first device, means for receiving, from the second device, a slot indication of one or more future time slots available for the second device to receive from the first device using at least one of the first receive spatial configuration respectively indicated by the RCI, and means for transmitting, to the second device, a communication on the one or more future slots using the first transmit spatial configuration of the first device.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a diagram illustrating an example of beamforming in a multi-TRP environment according to some aspects.

FIG. 13 is a flow chart illustrating an exemplary process for wireless communication according to some aspects.

DETAILED DESCRIPTION

Figure 1:
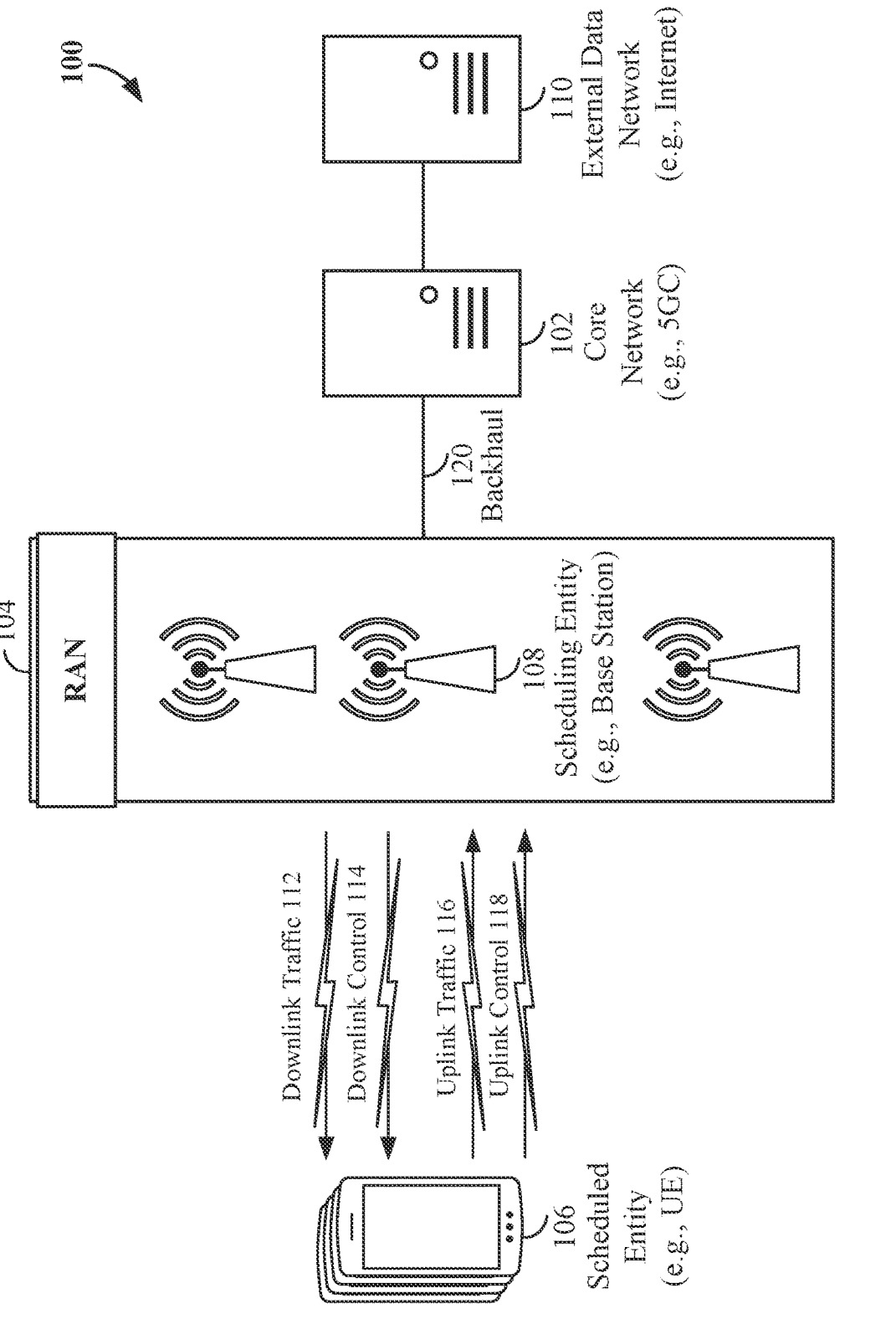
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As a part of a beam management procedure, the base station may indicate a TCI state to a user equipment (UE), where the TCI state explicitly indicate which downlink beam is being used by the base station. However, no explicit indication of a receive beam/receive spatial configuration for a receiver device is currently available for communication between a base station and a UE, or communication between peer devices such as UEs. Hence, according to some aspects of the disclosure, a first wireless device that is configured to use a receive spatial configuration of the first wireless device to receive communication may transmit a receive configuration indicator (RCI) to indicate the receive spatial configuration of the first wireless device. Therefore, the first wireless device may be capable of providing an explicit indication of the RCI to indicate the receive spatial configuration of the first wireless device, which is associated with a receive beam of the first wireless device. The first wireless device may further transmit to other wireless devices (e.g., via unicast, broadcast, or multicast) a slot indication of future time slots to receive using the receive spatial configuration of the first wireless device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
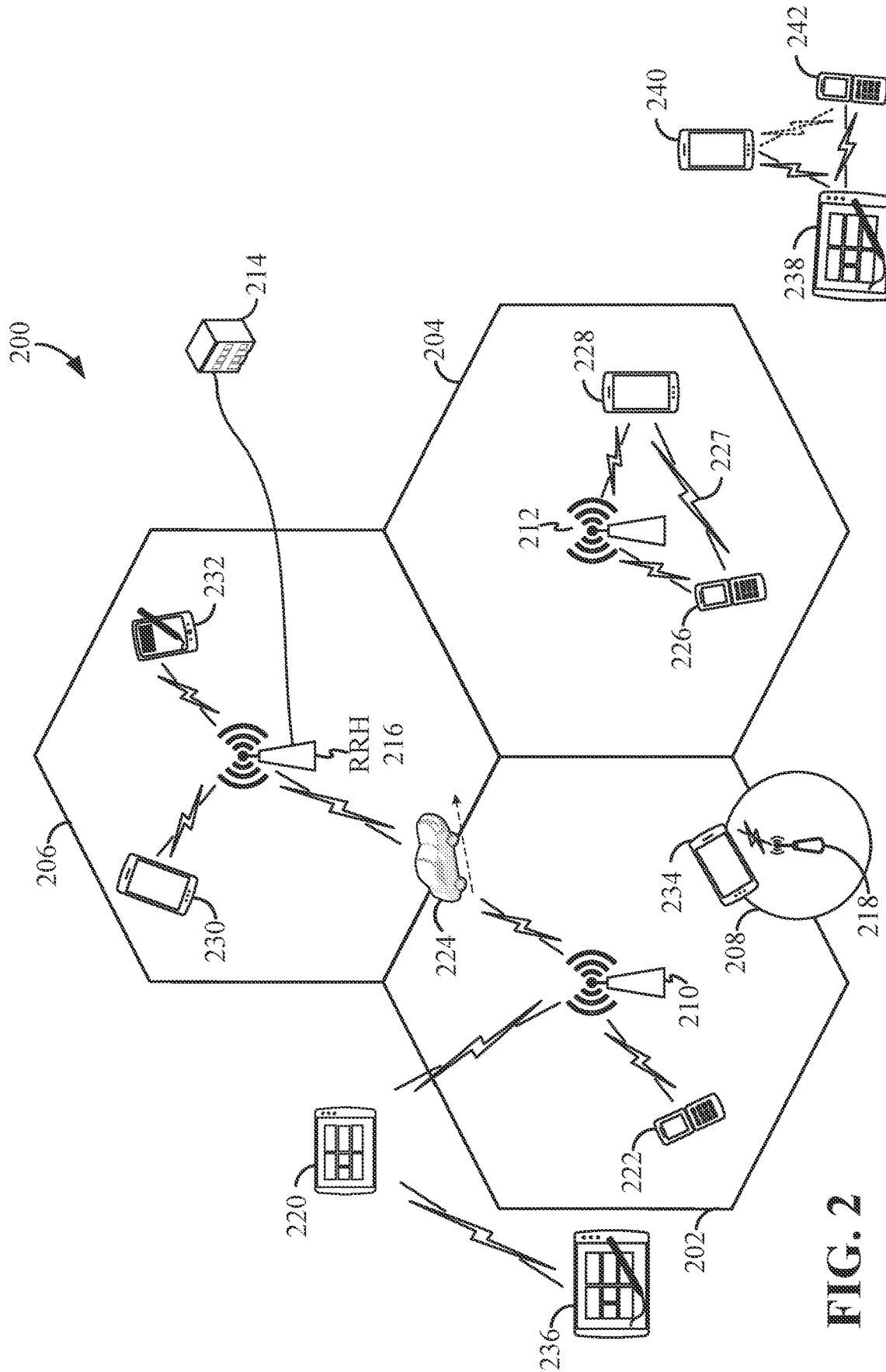
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-everything (V2X) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF)

that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In some examples, beamformed signals may be utilized between the UE 228 and the base station 212 communicating, for example, over a mmWave carrier, such as FR2, FR4-a, FR4-1, FR4, or FR5. To facilitate beamformed multi-stream communication, the base station 212 may select a respective beam pair link (BPL) between the UE 228 and the base station 212 for spatial division multiplexing (SDM) of a respective stream on each of the BPLs. Each selected BPL may be associated with a respective transmission configuration indicator (TCI) state that indicates quasi co-location (QCL) information (e.g., QCL-Types) between a downlink reference signal, such as a synchronization signal block (SSB) or channel state information-reference signal (CSI-RS), and a downlink signal or downlink channel (e.g., a physical downlink shared channel) communicated on the selected BPL.

An example of QCL information includes QCL-TypeD, which indicates a spatial property of a beam (e.g., a beam direction and/or beam width) associated with a particular downlink reference signal. By indicating the QCL-TypeD information for a PDSCH transmission, the base station 212 may inform the UE 228 that the PDSCH transmission uses the same downlink (transmit) beam as a configured reference signal. In simple terms, it may be said that a TCI state can include a beam indication that explicitly identifies which downlink beam is being used by the base station 212.

For multi-stream PDSCH communications, the base station 212 indicates the respective TCI state (e.g., respective beam) for each stream. The selected TCI states for a multi-stream PDSCH communication may be transmitted from the base station 212 to the UE 228 within, for example, control information (e.g., downlink control information (DCI)) that further carries the resource assignment (e.g., time-frequency resources) for the multi-stream PDSCH communication. For example, the selected TCI state for a particular stream may be signaled using three bits in the DCI. However, since the control information includes a separate selected TCI state for each stream, the signaling overhead increases linearly with the number of streams.

Therefore, in various aspects of the disclosure, the base station 212 and UE 228 may enable TCI state groups to be configured on the base station 212 and UE 228. Each TCI state group includes a plurality of (e.g., two or more) TCI states, each indicating a respective transmit (downlink) beam on which a corresponding stream of a multi-stream PDSCH communication is transmitted. In some examples, the base station 212 may group various transmit beams of the base station 212 into a plurality of beam groups. Each beam group may include a single transmit beam from the base station 212 for multi-stream communication. The base station 212 may then configure a plurality of TCI state groups for the UE 228, each corresponding to a different respective beam group, and transmit the TCI state groups to the UE 228. The TCI state groups may be configured, for example, based on a beam report received from the UE 228. For example, the UE 228 may obtain a respective beam quality metric for each transmit beam from the base station 212 and transmit the beam report indicating the beam groups based on the respective beam quality metrics.

In some examples, the base station 212 may transmit a radio resource control (RRC) configuration of the plurality of TCI state groups (e.g., an RRC TCI state groups table) to the UE 228. The RRC TCI state groups table may include a respective TCI state group identifier and a list of the TCI states included within the respective TCI state group for each of the TCI state groups. The UE 228 may then store the RRC TCI state groups table for use in receiving a subsequent multi-stream communication. In some examples, the base station 212 may further transmit an activation message (e.g., a MAC-CE) to the UE that activates a set of active TCI state groups of the plurality of TCI state groups. The UE 228 may further store the set of active TCI state groups. For a multi-stream PDSCH communication, the base station 212 may then select one of the active TCI state groups for transmission of the multi-stream PDSCH communication and include the selected active TCI state group in the control information (e.g., DCI) scheduling the multi-stream PDSCH communication.

Figure 3:
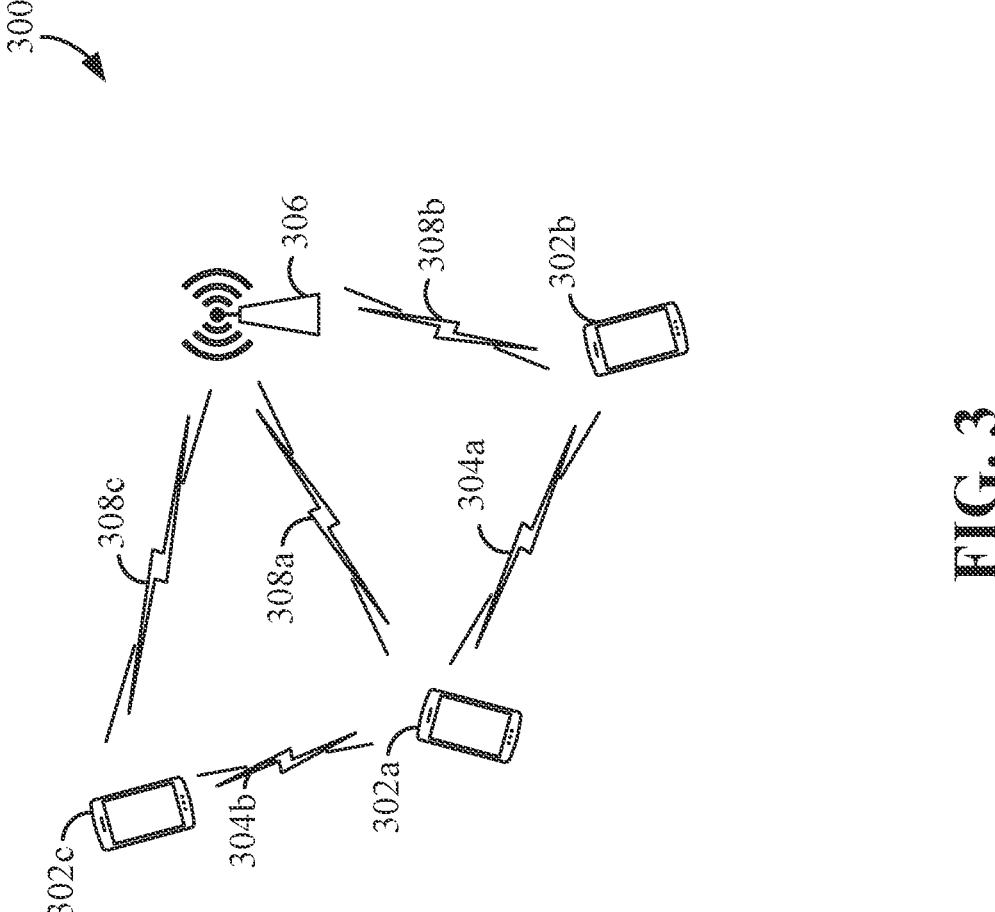
FIG. 3 is a diagram illustrating an example of a wireless communication system for facilitating both cellular and sidelink communication according to some aspects.

FIG. 3 is a diagram illustrating an example of a wireless communication system 300 for facilitating both cellular and sidelink communication. The wireless communication system 300 includes a plurality of wireless communication devices 302a, 302b, and 302c and a base station (e.g., eNB or gNB) 306. In some examples, the wireless communication devices 302a, 302b, and 302c may be UEs capable of implementing D2D or V2X devices within a V2X network.

The wireless communication devices 302a and 302b may communicate over a first PC5 interface 304a, while wireless communication devices 302a and 302c may communicate over a second PC5 interface 304b. Wireless communication devices 302a, 302b, and 302c may further communicate with the base station 306 over respective Uu interfaces 308a, 308b, and 308b. The sidelink communication over the PC5 interfaces 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 304a and 304b and Uu interfaces 308a-308c, such that resources on the common carrier may be allocated for both sidelink communication between wire-less communication devices 302a-302c and cellular communication (e.g., uplink and downlink communication) between the wireless communication devices 302a-302c and the base station 306. For example, the wireless communication system 300 may be configured to support a V2X network in which resources for both sidelink and cellular communication are scheduled by the base station 306. In other examples, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
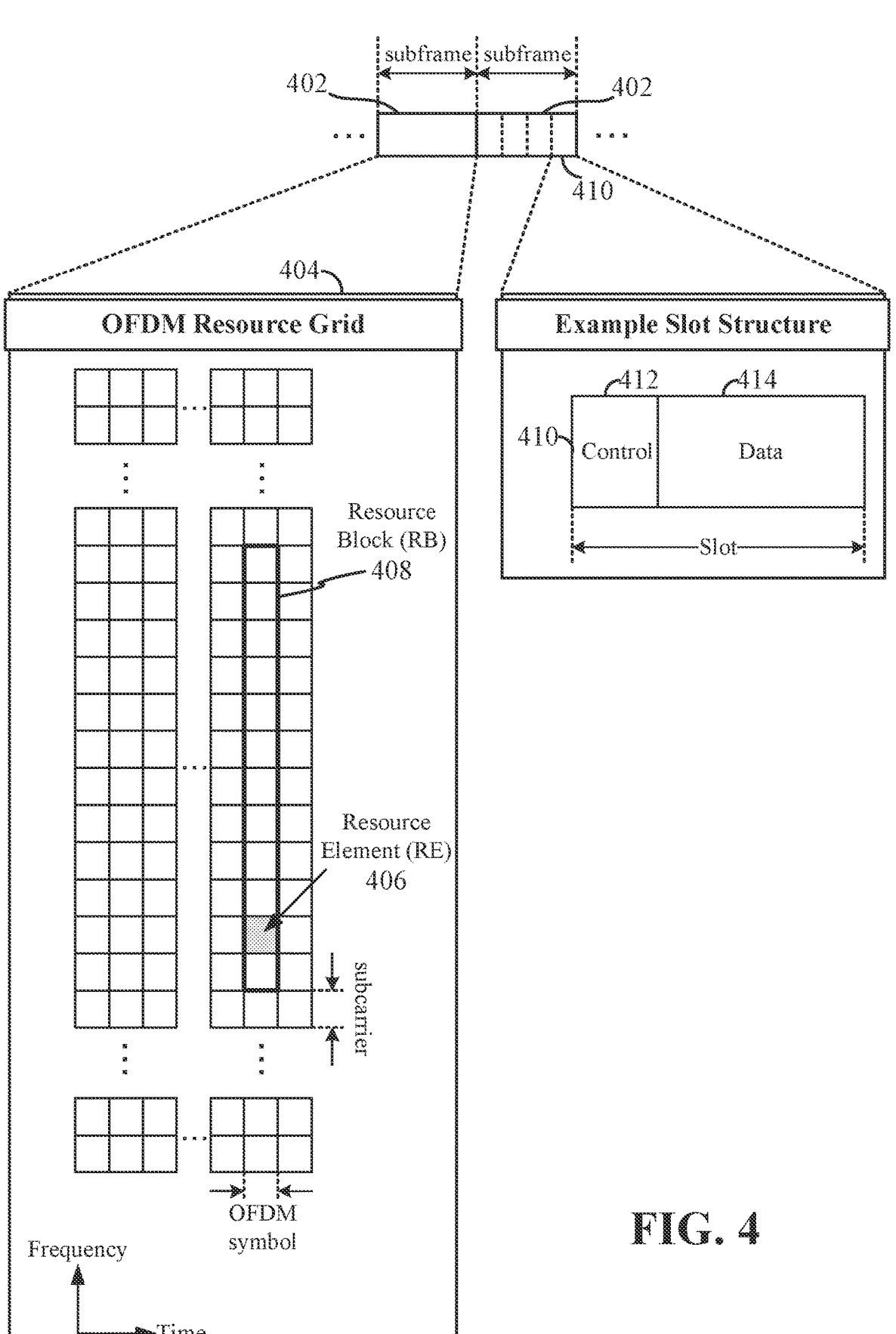
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 4, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC4 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
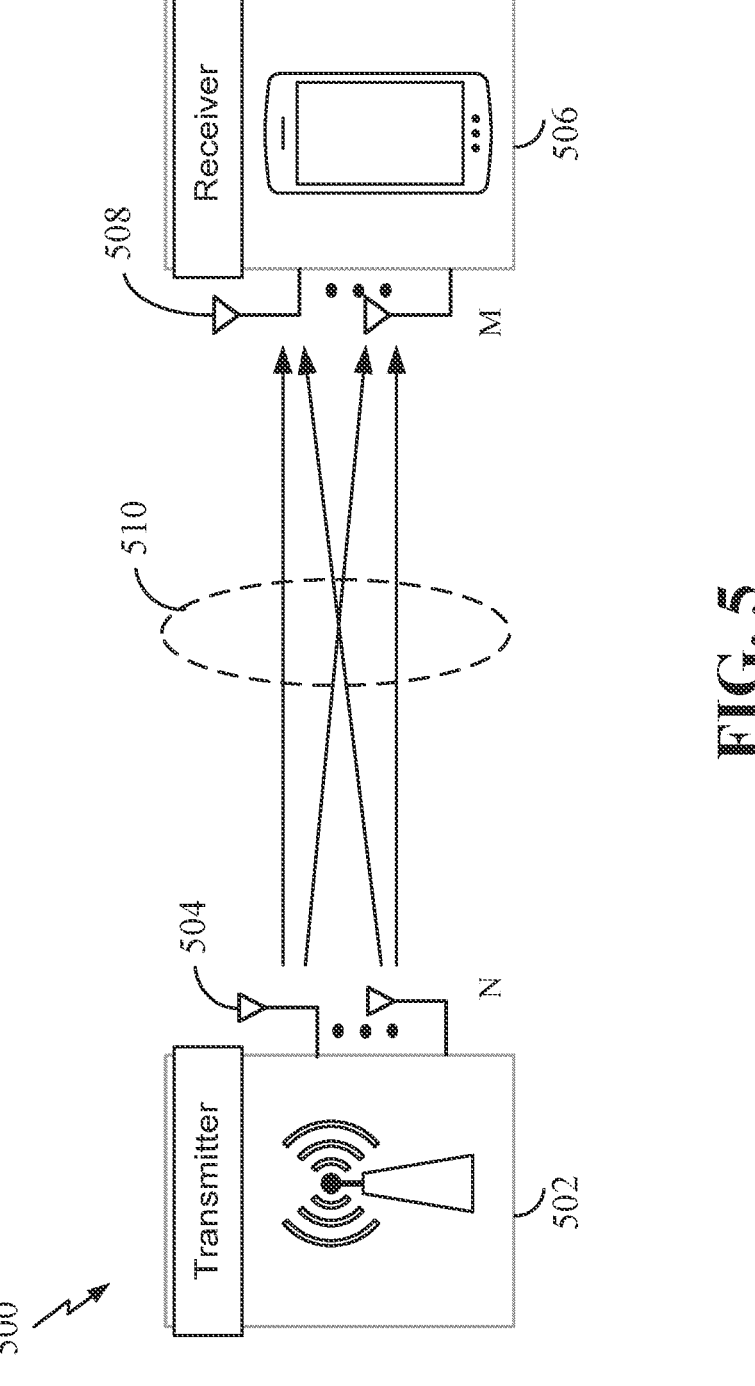
FIG. 5 is a block diagram illustrating a wireless communication system supporting multiple-input multiple-output (MIMO) communication.

FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

To facilitate multi-stream communication using SDM, the transmitter 502 and receiver 506 may configure TCI state groups for multi-stream communication between the receiver 506 and the transmitter 502 and between the receiver 506 and at least one additional transmitter (not shown). Here, the receiver 506 may correspond to a UE or other scheduled entity and the transmitter 502 may correspond to a base station or other scheduling entity coordinating communication among multiple TRPs. For example, the transmitter 502 may be configured to configure a plurality of TCI state groups for the receiver 506 and to transmit the plurality of TCI state groups to the receiver 506. For example, the transmitter 502 may be configured to transmit an RRC configuration of the plurality of TCI state groups (e.g., an RRC TCI state groups table) to the receiver 506. The RRC TCI state groups table may include a respective TCI state group identifier for each of the TCI state groups, along with a list of the respective TCI states included within each TCI state group. The receiver 506 may then store the plurality of TCI state groups received from the transmitter 502.

In some examples, the transmitter 502 of the transmitter 502 may further be configured to transmit an activation message (e.g., a MAC-CE) to the receiver 506 that activates a set of active TCI state groups of the plurality of TCI state groups. The receiver 506 may further store the set of active TCI state groups. For a multi-stream PDSCH communication, the transmitter 502 of the transmitter 502 may then select one of the active TCI state groups for transmission of the multi-stream PDSCH communication and transmit control information (e.g., DCI) including the selected active TCI state group for the multi-stream PDSCH communication.

FIG. 6 is a diagram 600 illustrating an example of beamforming in communication between a UE 602 and a base station 604 according to some aspects. The base station 604 may correspond to a macro-cell, a small cell, a pico cell, a femto-cell, a relay node, or other radio access network (RAN) nodes. The base station 604 may be any of the base stations or scheduling entities illustrated in FIGS. 1-3 and/or 5. The UE 602 may be any of the UEs or scheduled entities illustrated in FIGS. 1-3 and/or 5.

The base station 604 may generally be capable of communicating with the UE 602 using one or more base station beams on the base station 604, and the UE 602 may further be capable of communicating with the base station 604 using one or more UE beams on the UE 602. As used herein, the term base station beam may refer to a beam on the base station 604 that may be utilized for downlink or uplink communication with the UE 602. In addition, the term UE beam may refer to a beam on the UE 602 that may be utilized for downlink or uplink communication with the base station 604.

In the example shown in FIG. 6, the base station 604 is configured to generate a plurality of base station beams 606a-606h, each associated with a different spatial direction. In addition, the UE 602 is configured to generate a plurality of UE beams 608a-608g, each associated with a different spatial direction. In some examples, the base station 604 and UE 602 may each transmit more or less beams distributed in all directions (e.g., 360 degrees) and in three-dimensions. In addition, the base station beams 606a-606h may include beams of varying beam width. For example, the base station 604 may transmit certain signals (e.g., SSBs) on wider beams and other signals (e.g., CSI-RSs) on narrower beams. In some examples, the base station beams 606a-606h on the base station 604 and the UE beams 608a-608g on the UE 602 may be spatially directional mmWave beams (e.g., FR2, FR4-a or FR4-1, FR4, FR5 or other frequency range designation).

A beam management procedure may involve determining (e.g., by the base station 604) one or more beam pair links (BPLs) between the base station 604 and the UE 602. The beam management procedure may include beam determination of available beam pair links, measurement of quality of the available beam pair links, reporting of the measurement, and beam sweeping to find the best beam pair links.

In the example shown in FIG. 6, the base station 604 and the UE 602 may select one or more base station beams 606a-606h on the base station 604 and one or more UE beams 608a-608g on the UE 602 for communication of uplink and downlink signals therebetween using a beam management procedure. In one example, during initial cell acquisition on the base station 604, the UE 602 may perform a respective P1 beam management procedure to scan the plurality of base station beams 606a-606h on the base station 604, on the plurality of UE beams 608a-608g to select a respective BPL associated with the base station 604 for a physical random access channel (PRACH) procedure for initial access. For example, the UE 602 may select a BPL including one of the base station beams 606a-606h on the base station 604 and a corresponding one of the UE beams 608a-608g on the UE 602.

For example, periodic SSB beam sweeping may be implemented on the base station 604 at certain intervals (e.g., based on the SSB periodicity). Thus, the base station 604 may be configured to sweep or transmit an SSB on each of a plurality of wider base station beams 606a-606h during the respective beam sweeping interval. The UE 602 may measure the reference signal received power (RSRP) of each of the SSB base station beams on each of the UE beams of the UE and, for each of the TRPs 604a and 604b, select the base station beams and the UE beams based on the measured RSRP. In an example, the selected UE beam may be the UE beam on which the highest RSRP is measured and the selected base station beam may have the highest RSRP as measured on the selected UE beam.

After completing the PRACH procedure, the base station 604 and UE 602 may perform a P2 beam management procedure for beam refinement at the base station 604. For example, the base station 604 may be configured to sweep or transmit a CSI-RS on each of a plurality of narrower base station beams 606a-606h on the base station 604. Each of the narrower CSI-RS beams may be a sub-beam of the selected SSB base station beam (e.g., within the spatial direction of the SSB base station beam). Transmission of the CSI-RS base station beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 602 is configured to scan the plurality of CSI-RS base station beams 606a-606h on one or more UE beams 608a-608g. The UE 602 then performs beam measurements (e.g., RSRP, SINR, etc.) of the received CSI-RSs on the one or more UE beams 608a-608g to determine the respective beam quality of each of the CSI-RS base station beams 606a-606h as measured on the one or more UE beams 608a-608g. In some examples, the UE 602 may measure the RSRP of each of the narrower CSI-RS base station beams 606a-606h from the base station 604 on the corresponding UE beams selected during the P1 beam management procedure.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS base station beams 606a-606h on the base station 604 on one or more of the UE beams 608a-608g to the base station 604. The base station 604 may then select one or more CSI-RS base station beams on the base station 604 on which to communicate downlink and/or uplink control and/or data with the UE 602. In some examples, the selected CSI-RS base station beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding UE beam on the UE 602 for each selected serving CSI-RS base station beam to form a respective beam pair link (BPL) for each selected serving CSI-RS base station beam. For example, the UE 602 can utilize the beam measurements obtained during the P2 beam management procedure or perform a P3 beam management procedure to obtain new beam measurements for the selected CSI-RS base station beams to select the corresponding UE beam for each selected base station beam. In some examples, the selected UE beam to pair with a particular CSI-RS base station beam may be the UE beam on which the highest RSRP for the particular CSI-RS base station beam is measured.

In addition, when the channel is reciprocal, the base station beams and the UE beams may be selected using an uplink beam management scheme. In an example, the UE 602 may be configured to sweep or transmit on each of a plurality of UE beams 608a-608g. For example, the UE 602 may transmit an SRS on each beam in the different beam directions. In addition, the base station 604 may be configured to receive the uplink beam reference signals on the plurality of base station beams 606a-606h. The base station 604 then performs beam measurements (e.g., RSRP, SINR, etc.) of the beam reference signals on each of the base station beams 606a-606h to determine the respective beam quality of each of the UE beams 608a-608g as measured on each of the base station beams 606a-606h on the base station 604.

The base station 604 may then select one or more base station beams on which to communicate downlink and/or uplink control and/or data with the UE 602. In some examples, the selected base station beam(s) have the highest RSRP. The UE 602 may then select a corresponding UE beam for each selected serving base station beam to form a respective beam pair link (BPL) for each selected serving base station beam, using, for example, a P3 beam management procedure, as described above.

In one example, a single base station beam on the base station 604 (e.g., beam 606b) and a single corresponding UE beam (e.g., beam 608f) on the UE 602 may form respective single BPLs used for communication between the base station 604 and the UE 602 for multi-stream communication. For example, a stream of a PDSCH may be communicated on a first BPL formed of base station beam 606b and UE beam 608f.

In some examples, after the UE 602 connects to the base station 604, the base station 604 may configure the UE 602 to perform SSB and/or CSI-RS beam measurements and provide an L1 measurement report containing beam measurements of SSB and/or CSI-RS base station beams 606a-606h. For example, the base station 604 may configure the UE 602 to perform SSB beam measurements and/or CSI-RS beam measurements for beam management, beam failure detection (BRD), beam failure recovery (BFR), cell reselection, beam tracking (e.g., for a mobile UE 602 and/or base station 604), or other beam optimization purpose.

In various aspects, upon receiving a beam report (e.g., an L1 measurement report) during a P2 procedure or other beam management procedure from the UE 602, the base station 604 may configure a plurality of TCI states for the UE 602 and provide the configured TCI states to the UE 602. For example, the UE 602 and the base station 604 may be capable of managing the configured TCI states for the UE 602. Each TCI state may include QCL information indicating a QCL assumption between a source reference signal and a target reference signal, where the source reference signal may include one or more of an SSB, sounding reference signal (SRS), tracking reference signal (TRS), CSI-RS for CQI, and CSI-RS for BM, and the target reference signal may include one or more of a TRS, a CSI-RS for BM, a CSI-RS for CQI, a DMRS for PDSCH, and a DMRS for PDCCH. For example, each TCI state may include QCL information (e.g., QCL-TypeD information) between a downlink reference signal, such as an SSB or CSI-RS, and a downlink signal or downlink channel (e.g., a PDSCH) to be communicated from the base station 604 to the UE 602. For example, the QCL information may indicate a particular beam on which a PDSCH may be transmitted. Thus, for example, the plurality of TCI states may respectively correspond to the plurality of base station beams 606a-606h.

In an example, to indicate a beam for a PDSCH, the following process may be performed. The UE 602 may be semi-statically configured (e.g., via RRC signaling by the base station 604) with up to M available TCI states, where M depends on a UE capability. The base station 604 may select a TCI state out of the available TCI states respectively associated with the plurality of base station beams 606a-606h and may indicate to the UE 602 the selected TCI state in DCI corresponding to a PDSCH. When the UE 602 receives the DCI indicating the selected TCI state, the UE 602 may select a receive beam out of the plurality of UE beams 608a-608g to receive communication from the base station 604 based on a QCL assumption indicated by the selected TCI state in the DCI. For example, the selected TCI state may indicate that a DMRS of the PDSCH is QCL'ed with a particular SSB index associated with a transmit beam of the base station 604. Then, in this example, the UE 602 may use the best receive beam of the UE 602 (e.g., out of the plurality of UE beams 608a-608g) to receive from the base station 604. The best receive beam of the UE 602 may be determined based on the particular SSB index that is associated with the transmit beam of the base station 604.

Figure 7B:
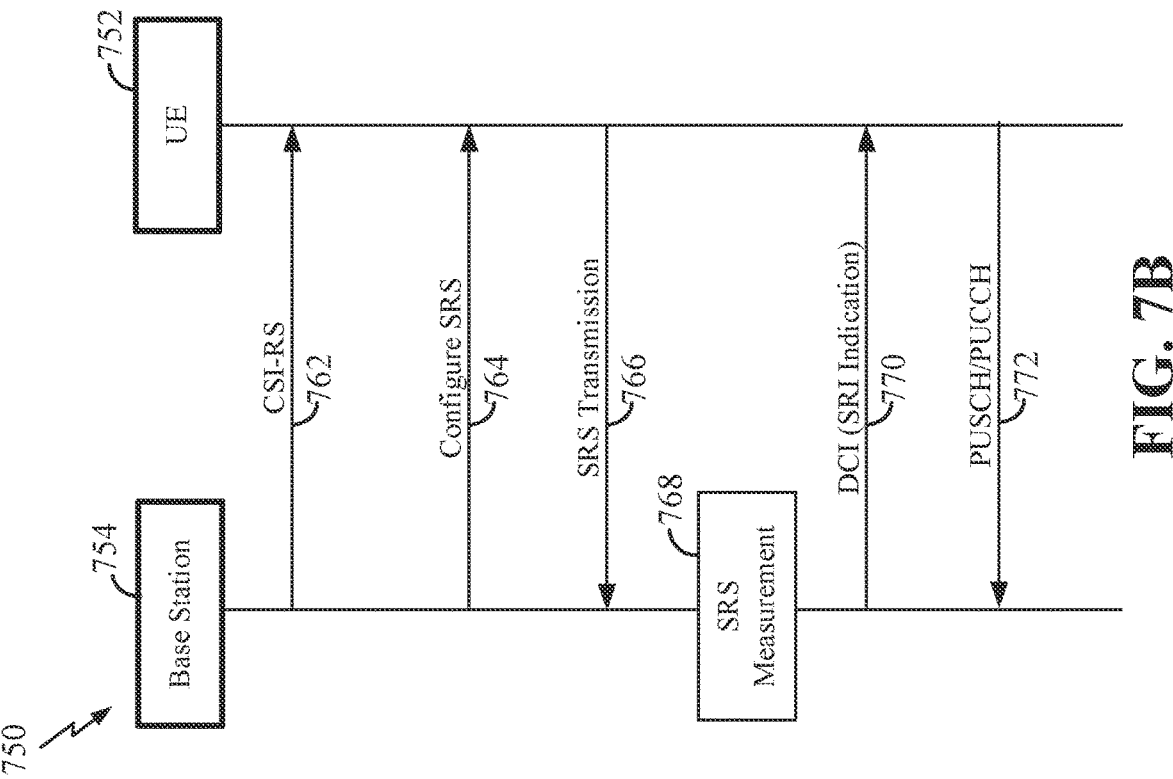
FIGS. 7A and 7B are example diagrams illustrating interactions between a user equipment (UE) and a base station during beam management procedures.
Figure 7A:
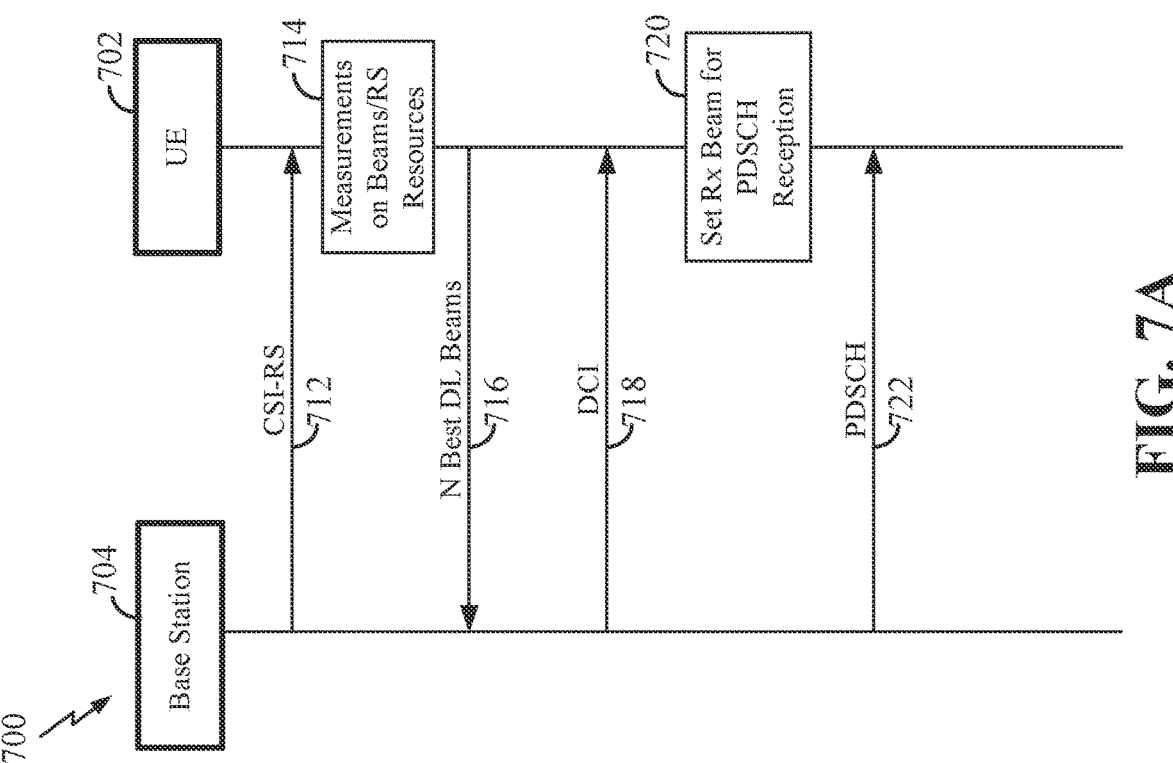

FIGS. 7A and 7B are example diagrams illustrating interactions between a UE and a base station during beam management procedures. Referring to FIG. 7A, the example diagram 700 illustrates interactions between a UE 702 and a base station 704 during a downlink beam management procedure. The UE 702 may be any of the UEs or scheduled entities illustrated in FIGS. 1-3, 5, and/or 6. The base station 704 may be any of the base stations or scheduling entities illustrated in FIGS. 1-3, 5, and/or 6.

After the UE 702 connects to the base station 704, at 712, the base station 704 may perform beam sweeping by transmitting a respective CSI-RS on each of its transmit beams of the base station 704. At 714, based on the CSI-RSs respectively corresponding to multiple beams of the base station 704, the base station may measure signal quality values (e.g., RSRP values) respectively corresponding to the multiple beams of the base station 704. At 716, the UE 702 may determine the best beam(s) of the base station 704 for downlink communication based on the measured signal quality values, and report such best beam(s). The best beam(s) may be the beam(s) corresponding to the highest measured signal quality values.

At 718, the base station 704 may transmit DCI to the UE 702, where the DCI may include a TCI state with QCL information indicating an QCL assumption between a source reference signal and a target reference signal. For example, the QCL information may relate one CSI-RS corresponding to a particular beam as a source reference signal and a DMRS for a PDSCH as a target reference signal.

At 720, the UE 702 may configure receive beam(s) of the UE 702 based on the QCL information to receive communication from the base station 704 using the configured receive beam(s).

At 722, the base station 704 may transmit a PDSCH using the best beam(s) indicated by the UE 702, and the UE 702 may receive the PDSCH using the receive beam(s) configured based on the QCL information.

Referring to FIG. 7B, the example diagram 750 illustrates interactions between a UE 752 and a base station 754 during an uplink beam management procedure. The UE 752 may be any of the UEs or scheduled entities illustrated in FIGS. 1-3, 5, and/or 6. The base station 754 may be any of the base stations or scheduling entities illustrated in FIGS. 1-3, 5, and/or 6.

After the UE 752 connects to the base station 754, at 762, the base station 754 may perform beam sweeping by transmitting a respective CSI-RS on each of its transmit beams of the base station 754. At 764, the base station 754 configures the UE 752 with SRS resources for uplink transmission.

If a beam correspondence holds, the configured SRS resource can indicate QCL with an DL reference signal. That is, if the UE 752 has determined its receive beam, the UE 752 may form a transmit beam based on the DL beam direction of the receive beam when the beam correspondence holds. For example, if a beam correspondence holds, a transmission on the SRS resource may utilize the same spatial configuration as the one used for the reception of the DL reference signal indicated by the configured SRS resource. A spatial configuration may be associated with a beam, and thus a transmit spatial configuration and a receive spatial configuration may respectively refer to a transmit beam and a receive beam. Alternatively, the UE 752 may perform beam sweeping to determine a best transmit beam of the UE 752.

At 766, the UE 752 transmits an SRS using the same spatial configuration as used while receiving the indicated DL reference signal or SRSs using beam sweeping at the UE 752.

At 768, the base station 754 may measure different SRSs (e.g., based on the beam sweeping by the UE 752), and determine a best transmit beam of the UE 752 for UL transmission based on the measurements of the SRSs. At 770, the base station 754 may transmit DCI to the UE 752, where the DCI includes an SRS resource indicator (SRI) to indicates to the UE 752 the best transmit beam of the UE 752 to use for a UL transmission. For example, the best transmit beam to use for the UL transmission may correspond to the SRS configuration indicated by SRI. At 772, the UE 752 may transmit an UL transmission to the base station 754 using the transmit indicated by the SRI.

As explained above, no explicit indication of a receive beam/receive spatial configuration for a receiver device is provided for communication between a base station and a UE (e.g., in a gNB-UE (Uu) link in NR). Based on the beam management procedures discussed above, a receiving device determines the best receive beam to use corresponding to a transmit beam from the transmitting device, where the receiving device may be a UE in DL communication or may be a base station in UL communication, and the transmitting device may be a base station in DL communication or may be a UE in UL communication. In particular, for DL communication, the base station indicates, to the UE, a TCI state that indicates a QCL assumption of a PDSCH DMRS with a DL grant, e.g. SSB index 'n', and, from this TCI state, the UE infers a receive beam to use for PDSCH reception. Further, for UL communication, the base station provides the SRI in a UL grant that indicates a transmit beam for the UE to use. For the UL communication, the base station may determine its receive beam based on beam correspondence with the transmit beam for the UE indicated the UL grant or based on a UL beam management done previously using SRS transmissions.

In some scenarios, a UE may broadcast or multicast (e.g., in sidelink communication) to other devices that the UE is available to receive on some slots using certain receive beams of the UE. Then, for example, other devices may determine to communicate with the UE if other devices have sufficient beam correspondence with one or more receive beams of the UE. The above-explained beam management procedures are used for unicast communication (e.g., over a Uu link). Hence, if the above-explained beam management procedures are used in scenarios involving multiple peer UEs, the UE may perform unicast communication to each of the multiple peer UEs to indicate a particular TCI state determined by the UE for a corresponding communication link, which may involve large signaling overhead due to the UE being connected to the multiple peer UEs. Further, the UE cannot perform the above-explained beam management procedures with other peer UEs that are not known to the UE.

Figure 8:
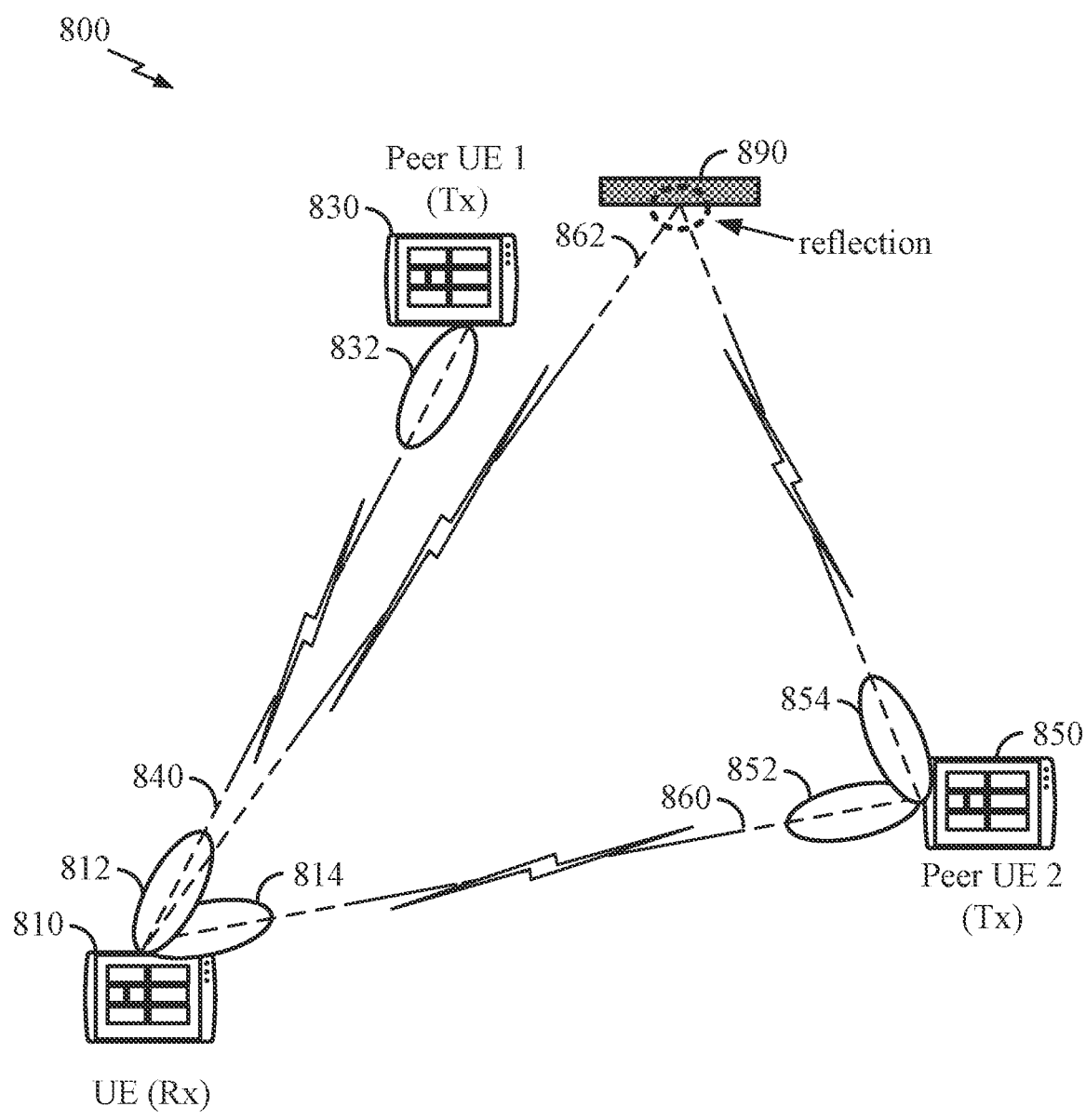
FIG. 8 is an example diagram illustrating a UE communicating with two peer UEs, according to some aspects.

FIG. 8 is an example diagram 800 illustrating a UE communicating with two peer UEs, according to some aspects. In FIG. 8, a UE 810 may communicate with a first peer UE 830 and a second peer UE 850, e.g., via sidelink. The UE 810 may utilize a first receive beam 812 to receive communication from the first peer UE 830 that utilizes a transmit beam 832 for transmission to the UE 810. Hence, between the UE 810 and the first peer UE 830, one BPL 840 may be identified based on the first receive beam 812 and the transmit beam 832. The UE 810 may utilize a second receive beam 814 to receive communication from a first transmit beam 852 of the second peer UE 850 and may utilize the first receive beam 812 to receive communication from a second transmit beam 854 of the second peer UE 850. Hence, between the UE 810 and the second peer UE 850, two BPLs 860 and 862 may be identified based on the second receive beam 814 and the first transmit beam 852 and based on the first receive beam 812 and the second transmit beam 854, respectively. In the example of FIG. 8, the transmission from the second transmit beam 854 of the second peer UE 850 is reflected off a wall 890, thereby changing its direction toward the first receive beam 812 of the UE 810 after the reflection. As discussed above, no explicit signaling to indicate the receive beams 812 and 814 of the UE 810 is performed.

In an example where the UE 810 can receive communication from the first peer UE 830 only via the first receive beam 812 in a particular slot, the UE 810 may also receive communication from another UE such as the second peer UE 850 in the same particular slot via the first receive beam 812. In this example, the UE 810 may not receive communication from another UE using a receive beam different from the first receive beam 812. Further, in this example, although the UE 810 may transmit using a different TRP in the same particular slot, the full duplex operation is feasible only for a direction corresponding to the first receive beam 812. For example, the full duplex operation by the UE 810 may be constrained to a direction corresponding to the first receive beam 812, both for transmission and reception.

In this example where the UE 810 can receive communication only via the first receive beam 812 in the particular slot, unicast signaling, which takes place with known peer devices and is not scalable, may be used to separately indicate to a peer device that the UE 810 can receive in the particular slot. In unicast signaling, the UE 810 may indicate to the first peer UE 830 that the UE 810 is available to receive communication from the first peer UE 830 in a future slot via a transmit beam 832 corresponding to TCI-1 of the first peer UE 830. Further, in unicast signaling, the UE 810 may separately indicate to the second peer UE 850 that the UE 810 is available to receive communication from the second peer UE 850 in a future slot via a second transmit beam 854 corresponding to TCI-2 of the second peer UE 850. However, the UE 810 may not be able to indicate to other peer UEs (e.g., the first peer UE 830 and the second peer UE 850) via broadcast or unicast that the UE 810 is available to receive communication via a certain receive beam of the UE 810.

According to some aspects of the disclosure, a first wireless device may configure the first wireless device to use a first receive spatial configuration of the first wireless device to receive communication, determine a receive configuration indicator (RCI) to indicate the first receive spatial configuration of the first wireless device, and transmit the RCI to another wireless device (e.g., second wireless device). For example, the first wireless device may configure the first wireless device to use the first receive spatial configuration of the first wireless device that corresponds to a first transmit spatial configuration of the second wireless device, and determine and transmit the RCI to the second wireless device. As discussed above, a receive spatial configuration and a transmit spatial configuration may respectively refer to a receive beam and a transmit beam. Hence, the first wireless device may explicitly indicate information associated with a first receive beam of the first wireless device to another device, via the first receive spatial configuration in the RC. In an aspect, the first receive spatial configuration may include more than one receive spatial configurations of the first wireless device.

In an aspect, the RCI may include one or more beam indexes respectively indicating one or more receive spatial configurations including the first receive spatial configuration.

In an aspect, to configure the first wireless device to use the first receive spatial configuration of the first wireless device, the first wireless device may receive, from the second wireless device, a first TCI indicating the first transmit spatial configuration of the second device. In this aspect, the first wireless device may configure the first wireless device to receive the communication using the first receive spatial configuration based on the first TCI of the second wireless device, and determine the RCI to indicate the first receive spatial configuration.

Figure 9:
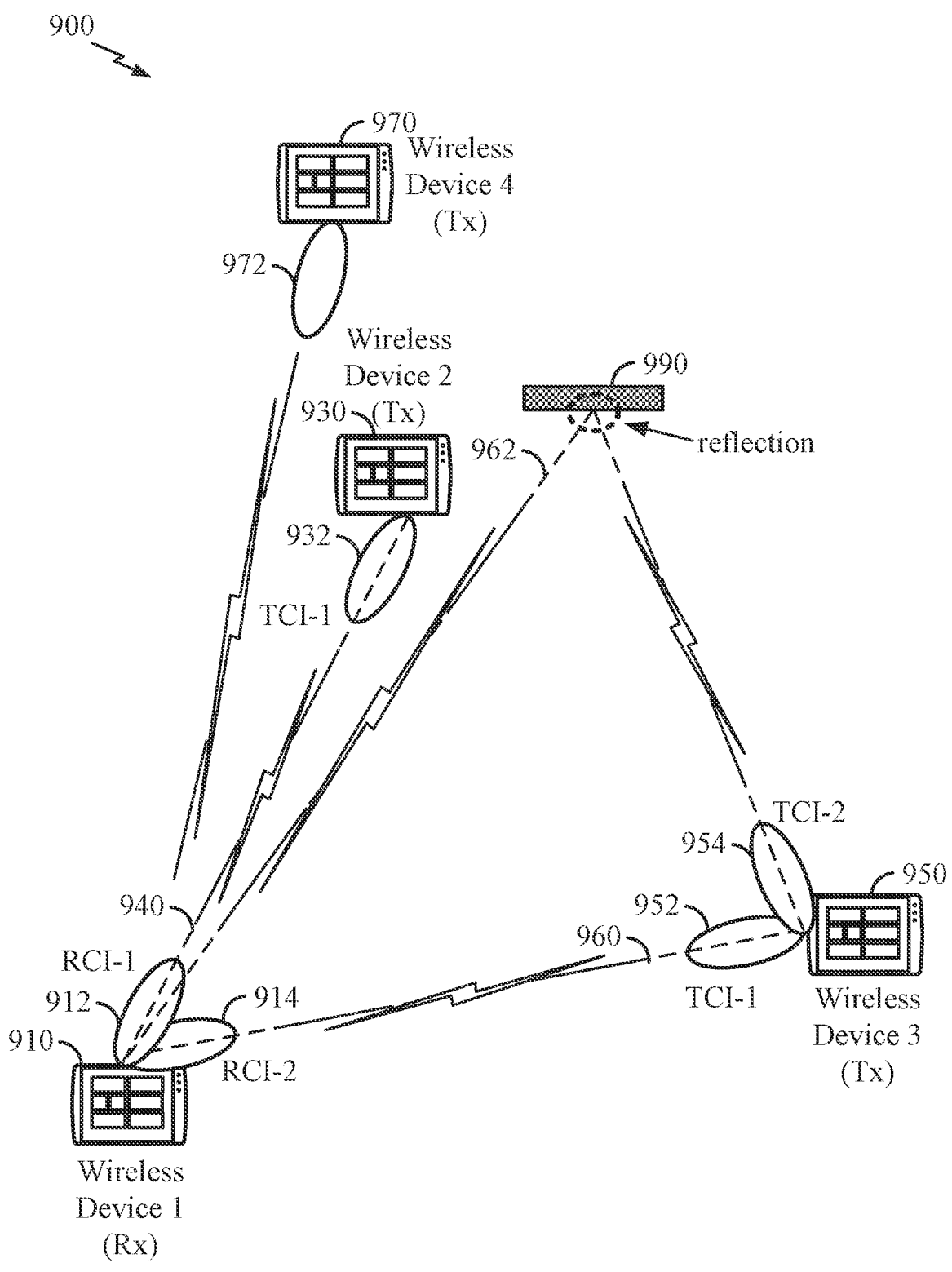
FIG. 9 is an example diagram illustrating wireless devices communicating with each other based on beam managements, according to some aspects.

FIG. 9 is an example diagram 900 illustrating wireless devices communicating with each other based on beam managements, according to some aspects. In FIG. 9, a first wireless device 910 may communicate with a second wireless device 930, a third wireless device 950, and a fourth wireless device 970, e.g., via sidelink. In an example, between the first wireless device 910 and the second wireless device 930, one BPL 940 may be identified using a spatial configuration of TCI state 1 (TCI-1) of the second wireless device 930. The first wireless device 910 may utilize a first receive beam 912 to receive communication from the second wireless device 930 that utilizes a transmit beam 932 for transmission to the first wireless device 910.

In an aspect, the first wireless device 910 may receive, from the second wireless device 930, the TCI-1 of the second wireless device 930 indicating a transmit spatial configuration associated with the transmit beam 932 of the second device 903. The first wireless device 910 may configure the first wireless device 910 to receive communication from the second wireless device 930 using a receive spatial configuration associated with the first receive beam 912 that corresponds to transmit spatial configuration associated with the transmit beam 932 of the second device 903, e.g., based the TCI-1 of the second wireless device 930. Subsequently, the first wireless device 910 may determine a first RCI (RCI-1) to indicate the receive spatial configuration associated with the first receive beam 912 of the first wireless device 910, and transmit the RCI-1 to the second wireless device 930. As such, the first wireless device 910 may explicitly indicate information about the first receive beam 912 of the first wireless device 910, via the RCI-1.

In an example, between the first wireless device 910 and the third wireless device 950, two BPLs 960 and 962 may be identified using the spatial configurations of TCI state 1 (TCI-1) and TCI state 2 (TCI-2) of the third wireless device 950. The first wireless device 910 may utilize a second receive beam 914 to receive communication from a first transmit beam 952 of the second wireless device 930 and may utilize the first receive beam 912 to receive communication from a second transmit beam 954 of the second wireless device 930. In the example of FIG. 9, the transmission from the second transmit beam 954 of the second wireless device 930 is reflected off a wall 990, thereby changing its direction toward the first receive beam 912 of the first wireless device 910 after the reflection.

In an aspect, the first wireless device 910 may receive, from the third wireless device 950, the TCI-1 of the third wireless device 950 indicating a transmit spatial configuration associated with the first transmit beam 952 of the third wireless device 950. The first wireless device 910 may configure the first wireless device 910 to receive communication from the third wireless device 950 using a receive spatial configuration associated with the second receive beam 914 that corresponds to transmit spatial configuration associated with the first transmit beam 952 of the third wireless device 950, e.g., based the TCI-1 of the third wireless device 950. Subsequently, the first wireless device 910 may determine a second RCI (RCI-2) to indicate the receive spatial configuration associated with the second receive beam 914 of the first wireless device 910, and transmit the RCI-2 to the third wireless device 950. In an aspect, the first wireless device 910 may receive, from the third wireless device 950, the TCI-2 of the third wireless device 950 indicating a transmit spatial configuration associated with the transmit beam 954 of the third wireless device 950. The first wireless device 910 may configure the first wireless device 910 to receive communication from the third wireless device 950 using a receive spatial configuration associated with the first receive beam 912 that corresponds to transmit spatial configuration associated with the second transmit beam 954 of the third wireless device 950, e.g., based the TCI-2 of the third wireless device 950. Subsequently, the first wireless device 910 may determine the RCI-1 to indicate the receive spatial configuration associated with the second receive beam 914 of the first wireless device 910, and transmit the RCI-2 to the third wireless device 950.

In some aspects, the first wireless device may transmit (e.g., via sidelink), to the second wireless device, a slot indication of one or more future time slots available for the first wireless device to communicate using the first receive spatial configuration indicated by the RC. The first wireless device may receive a transmission from the second wireless device on the one or more future slots using the first receive spatial configuration. As such, the first wireless device may indicate that it is available to receive in certain future time slots using the first wireless receive spatial configuration indicated by the RC. Thus, for these particular future slots, the first wireless device may tune to the first receive beam corresponding to the RCI for any potential transmission from the second wireless device.

In an aspect, the first wireless device may transmit a channel quality measurement corresponding to the RCI to the second wireless device. In this aspect, the second wireless device may determine one or more transmission parameters based on the channel quality measurement, and may transmit the transmission to the first wireless device on the one or more future slots based on the one or more transmission parameters. In an aspect, the channel quality measurement may be based on at least one of a reference signal received power (RSRP) value, a reference signal received quality (RSRQ) value, a channel quality indicator (CQI), or a rank indicator (RI).

In an aspect, the first wireless device may transmit a beam correspondence indication to the second wireless device, where the beam correspondence indication indicates that the first wireless device supports beam correspondence to form a transmit beam that corresponds to a first receive beam identified by the RC. For example, if the first wireless device supports the beam correspondence, a beam pointing toward a same or similar direction may be configured for a transmit beam for transmission and a receive beam for reception at the first wireless device.

Referring to the example diagram of FIG. 9, the first wireless device 910 may transmit, to the second wireless device 930, a slot indication of future time slots available for the first wireless device 910 to communicate using the first receive spatial configuration indicated by the RCI-1. As such, the second wireless device 930 may transmit a transmission to the first wireless device 910 on at least one of the future time slots indicated in the slot indication, and the first wireless device 910 may receive this transmission on the at least one of the future time slots using the first receive spatial configuration (e.g., via the first receive beam 912). In an aspect, the first wireless device 910 may transmit a channel quality measurement corresponding to the RCI-1 to the second wireless device 930, such that the second wireless device 930 may determine a transmission parameter based on the channel quality measurement and utilize the transmission parameter to send the transmission to the first wireless device 910, which is received via using the first receive spatial configuration (e.g., via the first receive beam 912).

In an aspect, the first wireless device may transmit (e.g., via sidelink), to one or more other wireless devices, a slot indication of one or more future time slots available for the first wireless device to communicate using the first receive spatial configuration indicated by the RC. In an aspect, the slot indication of one or more future time slots may be transmitted via a broadcast transmission and/or a groupcast transmission. For example, in this example, the first wireless device may indicate the one or more future time slots available for the first wireless device (e.g., via broadcast or multicast) to other wireless devices, one or more of which may not be unknown to the first wireless device. Subsequently, the first wireless device may receive a transmission from at least one of the one or more other wireless devices on the one or more future slots using the first receive spatial configuration.

Referring to the example diagram of FIG. 9, the first wireless device 910 may transmit (e.g., via broadcast or multicast), to other wireless devices, a slot indication of future time slots available for the first wireless device 910 to communicate using the first receive spatial configuration indicated by the RCI-1. The other wireless devices may include devices known to the first wireless device 910 such as the second wireless device 930 and the third wireless device 950, and/or devices unknown to the first wireless device 910 such as the fourth wireless device 970. As such, at least one of the other devices may transmit a transmission to the first wireless device 910 on at least one of the future time slots indicated in the slot indication, and the first wireless device 910 may receive this transmission on the at least one of the future time slots using the first receive spatial configuration (e.g., via the first receive beam 912). For example, the first wireless device 910 may use the first receive spatial configuration (e.g., via the first receive beam 912) associated with the RCI-1 to receive transmissions from one or more of the second wireless device 930 via the transmit beam 932, the third wireless device 950 via the second transmit beam 954, and the fourth wireless device 970 via a transmit beam 974 on the at least one of the future time slots indicated in the slot indication.

In an example, the first wireless device 910 may not use the second receive spatial configuration associated with RCI-2 to receive communications on the future time slots that are to be used to receive communication via the first receive spatial configuration associated with RCI-1. In this example, the first wireless device 910 may not use the second receive spatial configuration (e.g., via the second receive beam 914) associated with RCI-2 to receive a transmission, such as a transmission transmitted via the first transmit beam 952 of the third wireless device 950.

In some aspect, the slot indication from the first wireless device 910 may indicate that RCI-1 is available for a first set of future time slots and RCI-2 is available for a second set of future time slots different from the first set of future time slots. For example, 50% of the future time slots may be available for RCI-1 and the other 50% of the future time slots may be available for RCI-2. In one example, the first set of future time slots may be time slots with even slot numbers, and the second set of future time slots may be time slots with odd slot numbers. In an example, the first wireless device 910 may receive a transmission via the first receive beam 912 on the first set of future time slots from the second transmit beam 954 of the third wireless device 950, and may receive a transmission via the second receive beam 914 on the second set of future time slots from the first transmit beam 952 of the third wireless device 950.

In some aspects, the first wireless device may transmit a sidelink communication to other wireless devices (e.g., via broadcast or connection-less groupcast) using a transmit beam associated with a particular TCI state, where the sidelink communication may indicate that the first wireless device supports a beam correspondence and may further indicate the particular TCI state. Another wireless device that receive the sidelink communication may determine link qualities of its various beams based on the sidelink communication, and select a receive beam that corresponds to the transmit beam of the first wireless device based on the link qualities. Then, this wireless device may transmit a transmission to the first wireless device using a transmit beam that corresponds to the selected receive beam, and the first wireless device may receive the transmission using a receive beam that corresponds to the particular TCI state/transmit beam of the first wireless device. In an aspect, the first wireless device may receive communications on one or more future time slots using the receive beam that corresponds to the particular TCI state/transmit beam of the first wireless device. Hence, even if the other wireless devices are not provided with any RCI state of the first wireless device, the transmit and receive beams for the wireless devices may be determined based on the beam correspondence.

Therefore, in an aspect, the first wireless device may transmit, to one or more other wireless devices, a sidelink communication to one or more wireless devices using a second transmit spatial configuration of the first wireless device. In this aspect, the sidelink communication may include a second TCI of the first wireless device and/or a beam correspondence indication. The second TCI indicates the second transmit spatial configuration of the first wireless device, while the beam correspondence indication may indicate that the first wireless device is capable of beam correspondence to form a receive beam that corresponds to the transmit beam indicated by the second TCI. In this aspect, the first wireless device may transmit a slot indication of one or more future time slots available for the first wireless device to communicate using a second receive spatial configuration that has a beam correspondence to the second TCI of the first wireless device, and may receive a transmission from at least one of the one or more wireless devices on the one or more future slots using the second receive spatial configuration that corresponds to the second transmit spatial configuration indicated by the second TCI. In an aspect, the slot indication of one or more future time slots may be transmitted via at least one of a broadcast transmission or a groupcast transmission.

Referring to the example diagram of FIG. 9, in an example, the first wireless device 910 may transmit a sidelink communication to the third wireless device 950 using a transmit beam associated with a second TCI, where the sidelink communication indicates that the first wireless device 910 supports a beam correspondence and further indicates the second TCI. The transmit beam of the first wireless device 910 may point toward a same or similar direction as the second receive beam 914. Based on link qualities of various receive beams when receiving the sidelink communication, the third wireless device 950 may select a receive beam and may determine a transmit beam that corresponds to the receive beam. The transmit beam determined may point toward a same or similar direction as the receive beam, and thus the transmit beam may be the first transmit beam 952 associated with the first TCI of the third wireless device 950. Therefore, the third wireless device 950 may transmit a transmission using the first transmit beam 952, and the first wireless device 910 may receive the transmission using the second receive beam 914.

In this example, the first wireless device 910 may transmit the a slot indication of future time slots available for the first wireless device 910 to communicate using the second receive beam 914 that has a beam correspondence to the second TCI of the first wireless device 910. Subsequently, the first wireless device 910 may receive a transmission (e.g., from the third wireless device 950) on the future slots using the second receive beam 914 that corresponds to the transmit beam indicated by the second TCI.

Figure 10:
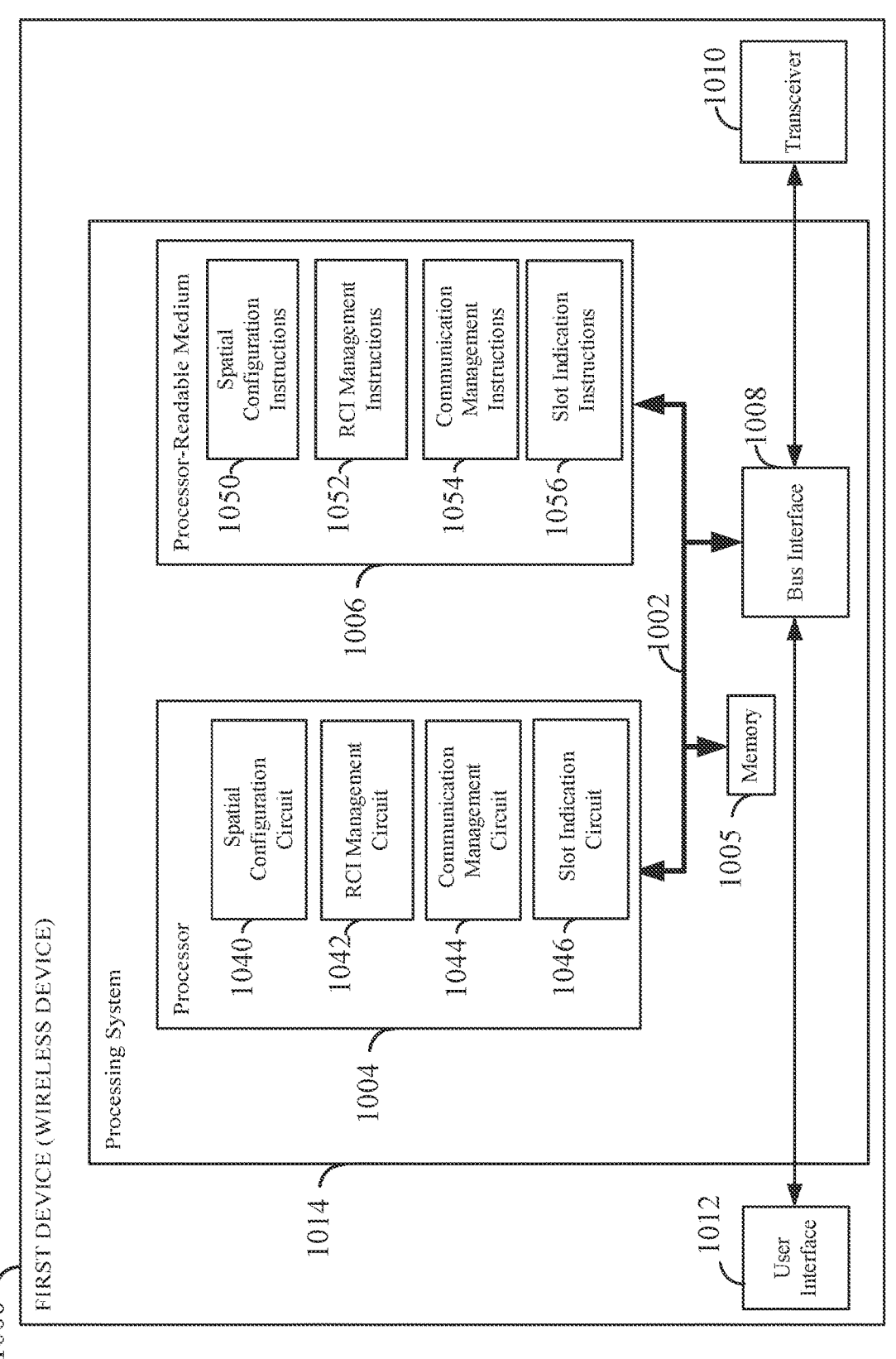
FIG. 10 is a block diagram conceptually illustrating an example of a hardware implementation for a first device according to some aspects.

FIG. 10 is a block diagram illustrating an example of a hardware implementation for a first device 1000 employing a processing system 1014. For example, the first device 1000 may be a wireless device such as a user equipment (UE) as illustrated in any one or more of FIGS. 1-3, 5-8 and/or 9.

The first device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the first device 1000 may be configured to perform any one or more of the functions described herein. That is, the processor 1004, as utilized in the first device 1000, may be used to implement any one or more of the processes and procedures described below and illustrated in FIGS. 11-14.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

In some aspects of the disclosure, the processor 1004 may include spatial configuration circuitry 1040 configured for various functions, including, for example, configuring the first device to receive, from a second device, a signal using a first receive spatial configuration of the first device that corresponds to a first transmit spatial configuration of the second device. For example, the spatial configuration circuitry 1040 may be configured to implement one or more of the functions described below in relation to FIGS. 11-12, including, e.g., blocks 1102 and 1204.

In some aspects, the spatial configuration circuitry 1040 may be configured for various functions, including, for example, receiving, from the second device, a first transmit configuration indicator (TCI) indicating the first transmit spatial configuration of the second device. For example, the spatial configuration circuitry 1040 may be configured to implement one or more of the functions described below in relation to FIG. 12, including, e.g., block 1202.

In some aspects, the spatial configuration circuitry 1040 may be configured for various functions, including, for example, transmitting, to a second device, a signal using a first transmit spatial configuration of the first device. For example, the spatial configuration circuitry 1040 may be configured to implement one or more of the functions described below in relation to FIGS. 13-14, including, e.g., blocks 1302 and 1404.

In some aspects, the spatial configuration circuitry 1040 may be configured for various functions, including, for example, transmitting, to the second device, a first transmit configuration indicator (TCI) indicating the first transmit spatial configuration of the first device. For example, the spatial configuration circuitry 1040 may be configured to implement one or more of the functions described below in relation to FIG. 14, including, e.g., block 1402.

In some aspects of the disclosure, the processor 1004 may include RCI management circuitry 1042 configured for various functions, including, for example, configuring the first device to receive, from a second device, a signal using a first receive spatial configuration of the first device that corresponds to a first transmit spatial configuration of the second device. For example, the RCI management circuitry 1042 may be configured to implement one or more of the functions described below in relation to FIGS. 11-12, including, e.g., blocks 1104 and 1206.

In some aspects, the RCI management circuitry 1042 may be configured for various functions, including, for example, receiving, from the second device, a receive configuration indication (RCI) to indicate a first receive spatial configuration of the second device that corresponds to the first transmit spatial configuration of the first device. For example, the RCI management circuitry 1042 may be configured to implement one or more of the functions described below in relation to FIGS. 13-14, including, e.g., blocks 1304 and 1406.

In some aspects of the disclosure, the processor 1004 may include communication management circuitry 1044 configured for various functions, including, for example, transmitting the RCI to the second device. For example, the communication management circuitry 1044 may be configured to implement one or more of the functions described below in relation to FIGS. 11-12, including, e.g., blocks 1106 and 1208.

In some aspects, the communication management circuitry 1044 may be configured for various functions, including, for example, transmitting, to the second device, a communication on the one or more future slots using the first transmit spatial configuration of the first device. For example, the communication management circuitry 1044 may be configured to implement one or more of the functions described below in relation to FIGS. 13-14, including, e.g., blocks 1308 and 1414.

In some aspects, the communication management circuitry 1044 may be configured for various functions, including, for example, transmitting, to the second device, a channel quality measurement corresponding to the RC. For example, the communication management circuitry 1044 may be configured to implement one or more of the functions described below in relation to FIG. 12, including, e.g., block 1212.

In some aspects, the communication management circuitry 1044 may be configured for various functions, including, for example, receiving a transmission from the second device on the one or more future slots using the first receive spatial configuration. For example, the communication management circuitry 1044 may be configured to implement one or more of the functions described below in relation to FIG. 12, including, e.g., block 1214.

In some aspects, the communication management circuitry 1044 may be configured for various functions, including, for example, transmitting, to the second device, a beam correspondence indication to indicate that the first device supports beam correspondence to form a transmit beam that corresponds to a first receive beam identified by the RC. For example, the communication management circuitry 1044 may be configured to implement one or more of the functions described below in relation to FIG. 12, including, e.g., block 1216.

In some aspects, the communication management circuitry 1044 may be configured for various functions, including, for example, receiving a transmission from at least one of the one or more other devices on the one or more future slots using the first receive spatial configuration. For example, the communication management circuitry 1044 may be configured to implement one or more of the functions described below in relation to FIG. 12, including, e.g., block 1254.

In some aspects, the communication management circuitry 1044 may be configured for various functions, including, for example, receiving a transmission from at least one of the one or more devices on the one or more future slots using the second receive spatial configuration that corresponds to the second transmit spatial configuration indicated by the second TCI. For example, the communication management circuitry 1044 may be configured to implement one or more of the functions described below in relation to FIG. 12, including, e.g., block 1260.

In some aspects, the communication management circuitry 1044 may be configured for various functions, including, for example, receiving, from the second device, a channel quality measurement corresponding to the first RC. For example, the communication management circuitry 1044 may be configured to implement one or more of the functions described below in relation to FIG. 14, including, e.g., block 1410.

In some aspects, the communication management circuitry 1044 may be configured for various functions, including, for example, determining one or more transmission parameters based on the channel quality measurement. For example, the communication management circuitry 1044 may be configured to implement one or more of the functions described below in relation to FIG. 14, including, e.g., block 1412.

In some aspects, the communication management circuitry 1044 may be configured for various functions, including, for example, receiving, from the second device, a beam correspondence indication to indicate that the second device supports beam correspondence to form a transmit beam that corresponds to a first receive beam identified by the first RC. For example, the communication management circuitry 1044 may be configured to implement one or more of the functions described below in relation to FIG. 14, including, e.g., block 1416.

In some aspects, the communication management circuitry 1044 may be configured for various functions, including, for example, receiving a transmission from the second device using a first receive spatial configuration of the first device that corresponds to the transmit beam of the second device. For example, the communication management circuitry 1044 may be configured to implement one or more of the functions described below in relation to FIG. 14, including, e.g., block 1418.

In some aspects of the disclosure, the processor 1004 may include slot indication circuitry 1046 configured for various functions, including, for example, transmitting, to the second device, a slot indication of one or more future time slots available for the first device to communicate using the first receive spatial configuration indicated by the RCI. For example, the slot indication circuitry 1046 may be configured to implement one or more of the functions described below in relation to FIG. 12, including, e.g., block 1210.

In some aspects, the slot indication circuitry 1046 may be configured for various functions, including, for example, transmitting, to one or more other devices, a slot indication of one or more future time slots available for the first device to communicate using the first receive spatial configuration indicated by the RC. For example, the slot indication circuitry 1046 may be configured to implement one or more of the functions described below in relation to FIG. 12, including, e.g., block 1252.

In some aspects, the slot indication circuitry 1046 may be configured for various functions, including, for example, transmitting a slot indication of one or more future time slots available for the first device to communicate using a second receive spatial configuration that has a beam correspondence to the second TCI of the first device. For example, the slot indication circuitry 1046 may be configured to implement one or more of the functions described below in relation to FIG. 12, including, e.g., block 1258.

In some aspects, the slot indication circuitry 1046 may be configured for various functions, including, for example, receiving, from the second device, a slot indication of one or more future time slots available for the second device to receive from the first device using at least one of the first receive spatial configuration respectively indicated by the RC. For example, the slot indication circuitry 1046 may be configured to implement one or more of the functions described below in relation to FIGS. 13-14, including, e.g., blocks 1306 and 1408.

The processor 1004 is responsible for managing the bus 1002 and general processing, including the execution of software stored on the computer-readable storage medium 1006. The software, when executed by the processor 1004, causes the processing system 1014 to perform the various functions described below for any particular apparatus. The computer-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1006 may include spatial configuration software/instructions 1050 configured for various functions, including, for example, configuring the first device to receive, from a second device, a signal using a first receive spatial configuration of the first device that corresponds to a first transmit spatial configuration of the second device. For example, the spatial configuration software/instructions 1050 may be configured to implement one or more of the functions described below in relation to FIGS. 11-12, including, e.g., blocks 1102 and 1204.

In some aspects, the spatial configuration software/instructions 1050 may be configured for various functions, including, for example, receiving, from the second device, a first transmit configuration indicator (TCI) indicating the first transmit spatial configuration of the second device. For example, the spatial configuration software/instructions 1050 may be configured to implement one or more of the functions described below in relation to FIG. 12, including, e.g., block 1202.

In some aspects, the spatial configuration software/instructions 1050 may be configured for various functions, including, for example, transmitting, to a second device, a signal using a first transmit spatial configuration of the first device. For example, the spatial configuration software/instructions 1050 may be configured to implement one or more of the functions described below in relation to FIGS. 13-14, including, e.g., blocks 1302 and 1404.

In some aspects, the spatial configuration software/instructions 1050 may be configured for various functions, including, for example, transmitting, to the second device, a first transmit configuration indicator (TCI) indicating the first transmit spatial configuration of the first device. For example, the spatial configuration software/instructions 1050 may be configured to implement one or more of the functions described below in relation to FIG. 14, including, e.g., block 1402.

In some aspects of the disclosure, the computer-readable storage medium 1006 may include RCI management software/instructions 1052 configured for various functions, including, for example, configuring the first device to receive, from a second device, a signal using a first receive spatial configuration of the first device that corresponds to a first transmit spatial configuration of the second device. For example, the RCI management software/instructions 1052 may be configured to implement one or more of the functions described below in relation to FIGS. 11-12, including, e.g., blocks 1104 and 1206.

In some aspects, the RCI management software/instructions 1052 may be configured for various functions, including, for example, receiving, from the second device, a receive configuration indication (RCI) to indicate a first receive spatial configuration of the second device that corresponds to the first transmit spatial configuration of the first device. For example, the RCI management software/instructions 1052 may be configured to implement one or more of the functions described below in relation to FIGS. 13-14, including, e.g., blocks 1304 and 1406.

In some aspects of the disclosure, the computer-readable storage medium 1006 may include communication management software/instructions 1054 configured for various functions, including, for example, transmitting the RCI to the second device. For example, the communication management software/instructions 1054 may be configured to implement one or more of the functions described below in relation to FIGS. 11-12, including, e.g., blocks 1106 and 1208.

In some aspects, the communication management software/instructions 1054 may be configured for various functions, including, for example, transmitting, to the second device, a communication on the one or more future slots using the first transmit spatial configuration of the first device. For example, the communication management software/instructions 1054 may be configured to implement one or more of the functions described below in relation to FIGS. 13-14, including, e.g., blocks 1308 and 1414.

In some aspects, the communication management software/instructions 1054 may be configured for various functions, including, for example, transmitting, to the second device, a channel quality measurement corresponding to the RC. For example, the communication management software/instructions 1054 may be configured to implement one or more of the functions described below in relation to FIG. 12, including, e.g., block 1212.

In some aspects, the communication management software/instructions 1054 may be configured for various functions, including, for example, receiving a transmission from the second device on the one or more future slots using the first receive spatial configuration. For example, the communication management software/instructions 1054 may be configured to implement one or more of the functions described below in relation to FIG. 12, including, e.g., block 1214.

In some aspects, the communication management software/instructions 1054 may be configured for various functions, including, for example, transmitting, to the second device, a beam correspondence indication to indicate that the first device supports beam correspondence to form a transmit beam that corresponds to a first receive beam identified by the RC. For example, the communication management software/instructions 1054 may be configured to implement one or more of the functions described below in relation to FIG. 12, including, e.g., block 1216.

In some aspects, the communication management software/instructions 1054 may be configured for various functions, including, for example, receiving a transmission from at least one of the one or more other devices on the one or more future slots using the first receive spatial configuration. For example, the communication management software/instructions 1054 may be configured to implement one or more of the functions described below in relation to FIG. 12, including, e.g., block 1254.

In some aspects, the communication management software/instructions 1054 may be configured for various functions, including, for example, receiving a transmission from at least one of the one or more devices on the one or more future slots using the second receive spatial configuration that corresponds to the second transmit spatial configuration indicated by the second TCI. For example, the communication management software/instructions 1054 may be configured to implement one or more of the functions described below in relation to FIG. 12, including, e.g., block 1260.

In some aspects, the communication management software/instructions 1054 may be configured for various functions, including, for example, receiving, from the second device, a channel quality measurement corresponding to the first RCI. For example, the communication management software/instructions 1054 may be configured to implement one or more of the functions described below in relation to FIG. 14, including, e.g., block 1410.

In some aspects, the communication management software/instructions 1054 may be configured for various functions, including, for example, determining one or more transmission parameters based on the channel quality measurement. For example, the communication management software/instructions 1054 may be configured to implement one or more of the functions described below in relation to FIG. 14, including, e.g., block 1412.

In some aspects, the communication management software/instructions 1054 may be configured for various functions, including, for example, receiving, from the second device, a beam correspondence indication to indicate that the second device supports beam correspondence to form a transmit beam that corresponds to a first receive beam identified by the first RC. For example, the communication management software/instructions 1054 may be configured to implement one or more of the functions described below in relation to FIG. 14, including, e.g., block 1416.

In some aspects, the communication management software/instructions 1054 may be configured for various functions, including, for example, receiving a transmission from the second device using a first receive spatial configuration of the first device that corresponds to the transmit beam of the second device. For example, the communication management software/instructions 1054 may be configured to implement one or more of the functions described below in relation to FIG. 14, including, e.g., block 1418.

In some aspects of the disclosure, the computer-readable storage medium 1006 may include slot indication software/instructions 1056 configured for various functions, including, for example, transmitting, to the second device, a slot indication of one or more future time slots available for the first device to communicate using the first receive spatial configuration indicated by the RC. For example, the slot indication software/instructions 1056 may be configured to implement one or more of the functions described below in relation to FIG. 12, including, e.g., block 1210.

In some aspects, the slot indication software/instructions 1056 may be configured for various functions, including, for example, transmitting, to one or more other devices, a slot indication of one or more future time slots available for the first device to communicate using the first receive spatial configuration indicated by the RCI. For example, the slot indication software/instructions 1056 may be configured to implement one or more of the functions described below in relation to FIG. 12, including, e.g., block 1252.

In some aspects, the slot indication software/instructions 1056 may be configured for various functions, including, for example, transmitting a slot indication of one or more future time slots available for the first device to communicate using a second receive spatial configuration that has a beam correspondence to the second TCI of the first device. For example, the slot indication software/instructions 1056 may be configured to implement one or more of the functions described below in relation to FIG. 12, including, e.g., block 1258.

In some aspects, the slot indication software/instructions 1056 may be configured for various functions, including, for example, receiving, from the second device, a slot indication of one or more future time slots available for the second device to receive from the first device using at least one of the first receive spatial configuration respectively indicated by the RC. For example, the slot indication software/instructions 1056 may be configured to implement one or more of the functions described below in relation to FIGS. 13-14, including, e.g., blocks 1306 and 1408.

Figure 11:
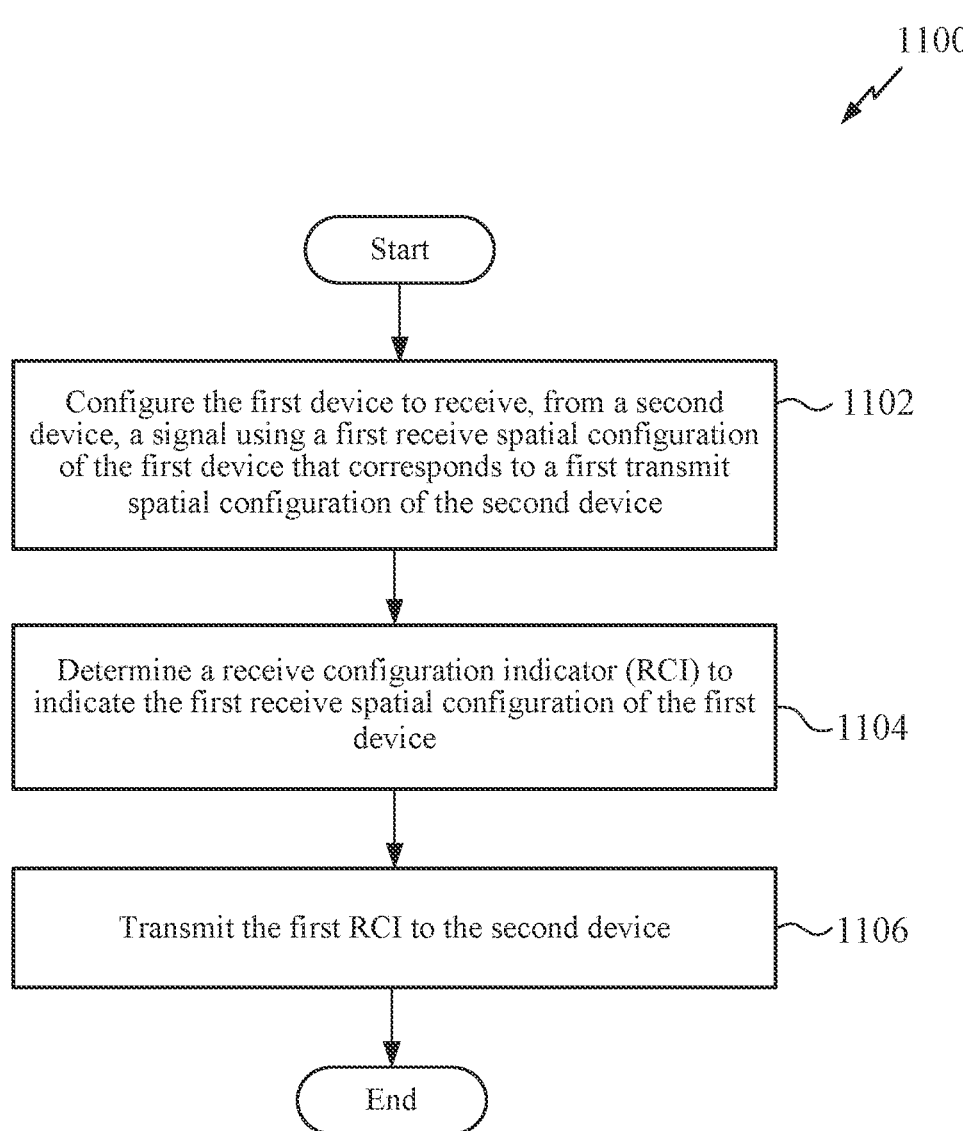
FIG. 11 is a flow chart illustrating an exemplary process for wireless communication according to some aspects.

FIG. 11 is a flow chart illustrating an exemplary process 1100 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the first device 1000 illustrated in FIG. 10. In some examples, the process 1100 may be carried out by any suitable apparatus or means for carrying out the functions or algorithm described below.

At block 1102, the first device 1000 may configure the first device 1000 to receive, from a second device, a signal using a first receive spatial configuration of the first device 1000 that corresponds to a first transmit spatial configuration of the second device. For example, the spatial configuration circuitry 1040 shown and described above in connection with FIG. 10 may provide means for configuring the first device 1000 to receive the signal.

At block 1104, the first device 1000 may determine a receive configuration indicator (RCI) to indicate the first receive spatial configuration of the first device 1000. For example, the RCI management circuitry 1042 shown and described above in connection with FIG. 10 may provide means for determining the RC. In an aspect, the RCI may include one or more beam indexes respectively indicating one or more receive spatial configurations including the first receive spatial configuration.

At block 1106, the first device 1000 may transmit the RCI to the second device. For example, the communication management circuitry 1044 shown and described above in connection with FIG. 10 may provide means for transmitting the RCI.

In one configuration, the first device 1000 for wireless communication includes means for configuring the first device 1000 to receive, from a second device, a signal using a first receive spatial configuration of the first device 1000 that corresponds to a first transmit spatial configuration of the second device, means for determine a receive configuration indicator (RCI) to indicate the first receive spatial configuration of the first device 1000, and means for transmitting the RCI to the second device. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Figure 12A:
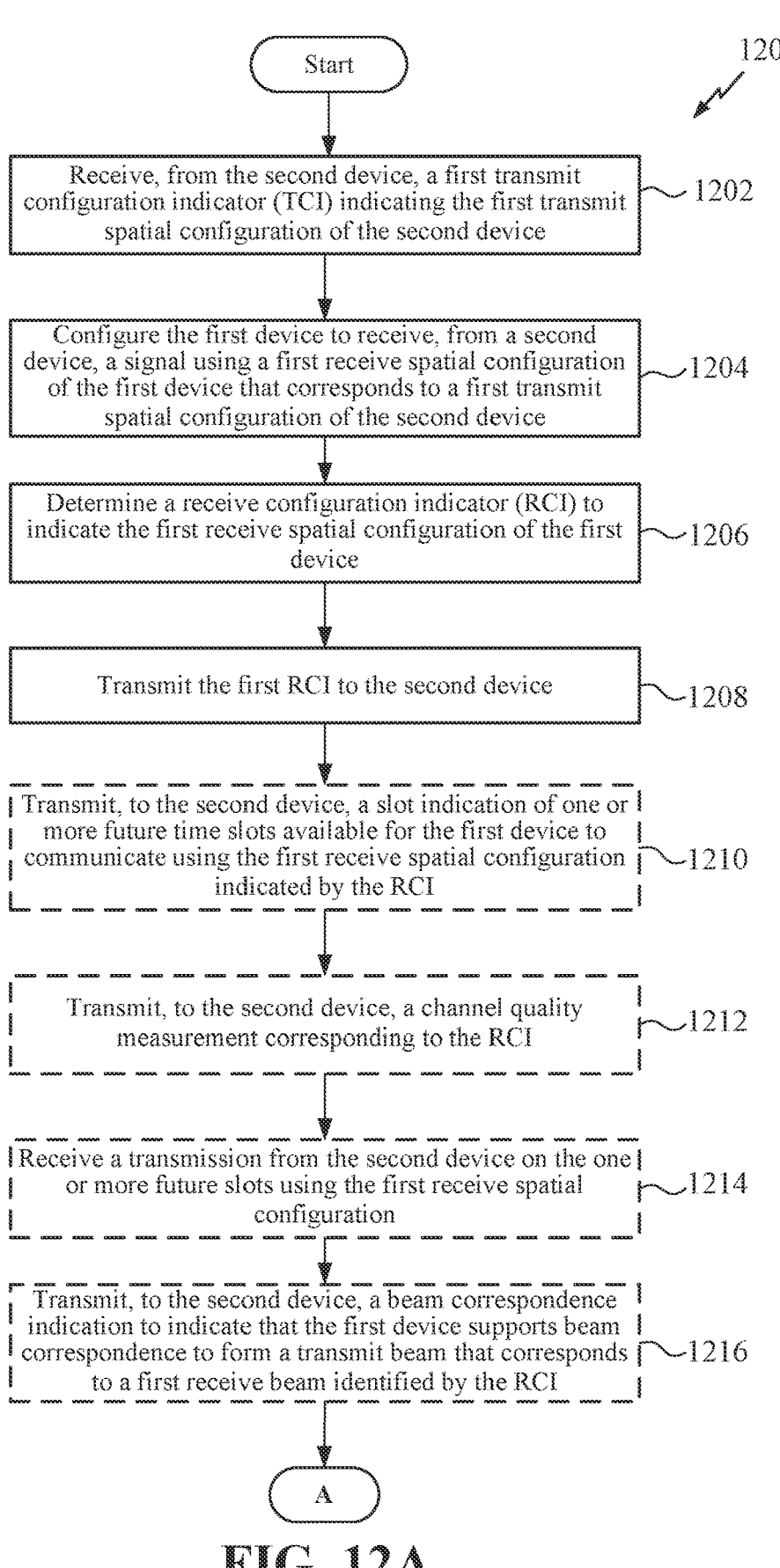
FIG. 12 is a flow chart illustrating an exemplary process for wireless communication according to some aspects.

FIG. 12A is a flow chart illustrating an exemplary process 1200 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the first device 1000 illustrated in FIG. 10. In some examples, the process 1200 may be carried out by any suitable apparatus or means for carrying out the functions or algorithm described below.

At block 1202, in an aspect, the first device 1000 may receive, from the second device, a first transmit configuration indicator (TCI) indicating the first transmit spatial configuration of the second device. For example, the spatial configuration circuitry 1040 shown and described above in connection with FIG. 10 may provide means for receiving the TCI.

At block 1204, the first device 1000 may configure the first device 1000 to receive, from a second device, a signal using a first receive spatial configuration of the first device 1000 that corresponds to a first transmit spatial configuration of the second device. For example, the spatial configuration circuitry 1040 shown and described above in connection with FIG. 10 may provide means for configuring the first device 1000 to receive the signal. In an aspect, the first device 1000 at block 1204 may be configured to receive the signal using the first receive spatial configuration based on the first TCI.

At block 1206, the first device 1000 may determine a receive configuration indicator (RCI) to indicate the first receive spatial configuration of the first device 1000. For example, the RCI management circuitry 1042 shown and described above in connection with FIG. 10 may provide means for determining the RC. In an aspect, the RCI may include one or more beam indexes respectively indicating one or more receive spatial configurations including the first receive spatial configuration.

At block 1208, the first device 1000 may transmit the RCI to the second device. For example, the communication management circuitry 1044 shown and described above in connection with FIG. 10 may provide means for transmitting the RCI.

At block 1210, in an aspect, the first device 1000 may transmit, to the second device, a slot indication of one or more future time slots available for the first device 1000 to communicate using the first receive spatial configuration indicated by the RC. For example, the slot indication circuitry 1046 shown and described above in connection with FIG. 10 may provide means for transmitting the slot indication.

At block 1212, in an aspect, the first device 1000 may transmit, to the second device, a channel quality measurement corresponding to the RC. For example, the communication management circuitry 1044 shown and described above in connection with FIG. 10 may provide means for transmitting the channel quality measurement. In an aspect, the channel quality measurement may be based on at least one of a reference signal received power (RSRP) value, a reference signal received quality (RSRQ) value, a channel quality indicator (CQI), or a rank indicator (RI).

At block 1214, in an aspect, the first device 1000 may receive a transmission from the second device on the one or more future slots using the first receive spatial configuration. For example, the communication management circuitry 1044 shown and described above in connection with FIG. 10 may provide means for receiving the transmission on the one or more future slots. In an aspect, the transmission from the second device at block 1214 may be based on one or more transmission parameters determined based on the channel quality measurement.

At block 1216, in an aspect, the first device 1000 may transmit, to the second device, a beam correspondence indication to indicate that the first device 1000 supports beam correspondence to form a transmit beam that corresponds to a first receive beam identified by the RC. For example, the communication management circuitry 1044 shown and described above in connection with FIG. 10 may provide means for transmitting the beam correspondence indication.

Figure 12B:
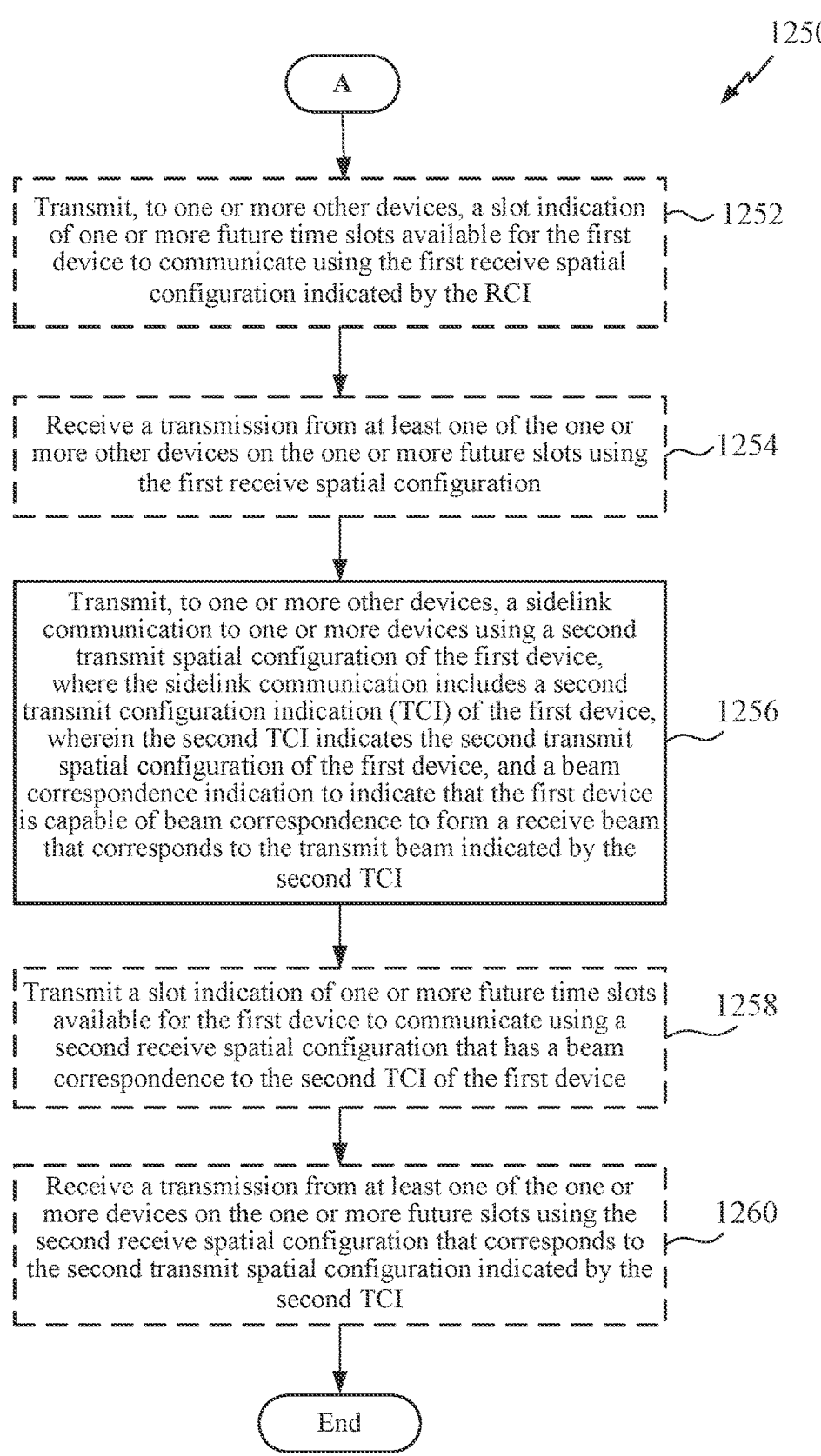

FIG. 12B is a flow chart illustrating an exemplary process 1250 for wireless communication in accordance with some aspects of the present disclosure. The process 1250 in FIG. 12B may continue from the process 1200 of FIG. 12A. As described below, some or all illustrated features may be omitted in a particular implementation within the scope of the present disclosure, and some illustrated features may not be required for implementation of all embodiments. In some examples, the process 1250 may be carried out by the first device 1000 illustrated in FIG. 10. In some examples, the process 1250 may be carried out by any suitable apparatus or means for carrying out the functions or algorithm described below.

At block 1252, in an aspect, the first device 1000 may transmit, to one or more other devices, a slot indication of one or more future time slots available for the first device 1000 to communicate using the first receive spatial configuration indicated by the RC. For example, the slot indication circuitry 1046 shown and described above in connection with FIG. 10 may provide means for transmitting the slot indication. In an aspect, the slot indication of one or more future time slots may be transmitted at block 1252 via at least one of a broadcast transmission or a groupcast transmission.

At block 1254, in an aspect, the first device 1000 may receive a transmission from at least one of the one or more other devices on the one or more future slots using the first receive spatial configuration. For example, the communication management circuitry 1044 shown and described above in connection with FIG. 10 may provide means for receiving the transmission on the one or more future slots.

At block 1256, the first device 1000 may transmit, to one or more other devices, a sidelink communication to one or more devices using a second transmit spatial configuration of the first device 1000, where the sidelink communication includes a second transmit configuration indicator (TCI) of the first device 1000, wherein the second TCI indicates the second transmit spatial configuration of the first device 1000, and a beam correspondence indication to indicate that the first device 1000 is capable of beam correspondence to form a receive beam that corresponds to the transmit beam indicated by the second TCI. For example, the communication management circuitry 1044 shown and described above in connection with FIG. 10 may provide means for transmitting the sidelink communication.

At block 1258, in an aspect, the first device 1000 may transmit a slot indication of one or more future time slots available for the first device 1000 to communicate using a second receive spatial configuration that has a beam correspondence to the second TCI of the first device 1000. For example, the slot indication circuitry 1046 shown and described above in connection with FIG. 10 may provide means for transmitting the slot indication. In an aspect, the slot indication of one or more future time slots may be transmitted at block 1258 via at least one of a broadcast transmission or a groupcast transmission.

At block 1260, in an aspect, the first device 1000 may receive a transmission from at least one of the one or more devices on the one or more future slots using the second receive spatial configuration that corresponds to the second transmit spatial configuration indicated by the second TCI. For example, the communication management circuitry 1044 shown and described above in connection with FIG. 10 may provide means for receiving the transmission on the one or more future slots.

In one configuration, the first device 1000 for wireless communication includes means for configuring the first device 1000 to receive, from a second device, a signal using a first receive spatial configuration of the first device 1000 that corresponds to a first transmit spatial configuration of the second device, means for determine a receive configuration indicator (RCI) to indicate the first receive spatial configuration of the first device 1000, and means for transmitting the RCI to the second device.

In an aspect, the first device 1000 may further include means for receiving, from the second device, a first transmit configuration indicator (TCI) indicating the first transmit spatial configuration of the second device. In an aspect, the first device 1000 may further include means for transmitting, to the second device, a slot indication of one or more future time slots available for the first device 1000 to communicate using the first receive spatial configuration indicated by the RCI, means for transmitting, to the second device, a channel quality measurement corresponding to the RCI, and means for receiving a transmission from the second device on the one or more future slots using the first receive spatial configuration. In an aspect, the first device 1000 may further include transmitting, to the second device, a beam correspondence indication to indicate that the first device 1000 supports beam correspondence to form a transmit beam that corresponds to a first receive beam identified by the RC. In an aspect, the first device 1000 may further include means for transmitting, to one or more other devices, a slot indication of one or more future time slots available for the first device 1000 to communicate using the first receive spatial configuration indicated by the RCI, and means for receiving a transmission from at least one of the one or more other devices on the one or more future slots using the first receive spatial configuration. In an aspect, the first device 1000 may further include means for transmitting, to one or more other devices, a sidelink communication to one or more devices using a second transmit spatial configuration of the first device 1000, means for transmitting a slot indication of one or more future time slots available for the first device 1000 to communicate using a second receive spatial configuration that has a beam correspondence to the second TCI of the first device 1000, and means for receiving a transmission from at least one of the one or more devices on the one or more future slots using the second receive spatial configuration that corresponds to the second transmit spatial configuration indicated by the second TCI.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-3, 5-8 and/or 9, and utilizing, for example, the processes and/or algorithms described herein in relation to FIGS. 11 and/or 12.

FIG. 13 is a flow chart illustrating an exemplary process 1300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the first device 1000 illustrated in FIG. 10. In some examples, the process 1300 may be carried out by any suitable apparatus or means for carrying out the functions or algorithm described below.

At block 1302, the first device 1000 may transmit, to a second device, a signal using a first transmit spatial configuration of the first device 1000. For example, the spatial configuration circuitry 1040 shown and described above in connection with FIG. 10 may provide means for configuring the first device 1000 to transmit the signal.

At block 1304, the first device 1000 may receive, from the second device, a receive configuration indications (RCI) to indicate a first receive spatial configuration of the second device that corresponds to the first transmit spatial configuration of the first device 1000. For example, the RCI management circuitry 1042 shown and described above in connection with FIG. 10 may provide means for receiving the RC. In an aspect, the RCI may include one or more beam indexes respectively indicating one or more receive spatial configurations including the first receive spatial configuration.

At block 1306, the first device 1000 may receive, from the second device, a slot indication of one or more future time slots available for the second device to receive from the first device 1000 using at least one of the first receive spatial configuration respectively indicated by the RC. For example, the slot indication circuitry 1046 shown and described above in connection with FIG. 10 may provide means for receiving the slot indication.

At block 1308, the first device 1000 may transmit, to the second device, a communication on the one or more future slots using the first transmit spatial configuration of the first device 1000. For example, the communication management circuitry 1044 shown and described above in connection with FIG. 10 may provide means for transmitting the communication on the one or more future slots.

In one configuration, the first device 1000 for wireless communication includes means for transmitting, to a second device, a signal using a first transmit spatial configuration of the first device 1000, means for receiving, from the second device, a receive configuration indication (RCI) to indicate a first receive spatial configuration of the second device that corresponds to the first transmit spatial configuration of the first device 1000, means for receiving, from the second device, a slot indication of one or more future time slots available for the second device to receive from the first device 1000 using at least one of the first receive spatial configuration respectively indicated by the RCI, and means for transmitting, to the second device, a communication on the one or more future slots using the first transmit spatial configuration of the first device 1000. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Figure 14:
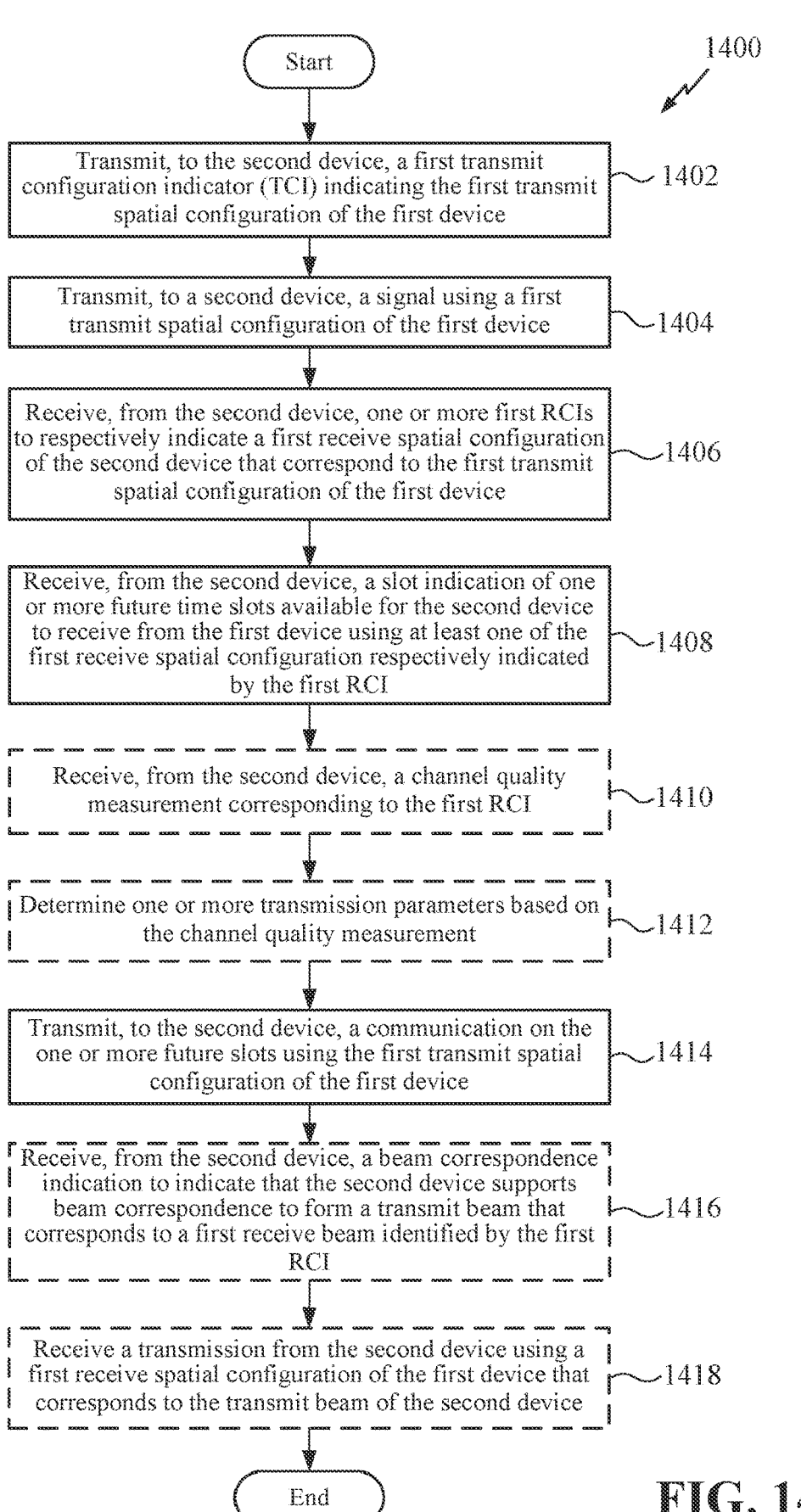
FIG. 14 is a flow chart illustrating an exemplary process for wireless communication according to some aspects.

FIG. 14 is a flow chart illustrating an exemplary process 1400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the first device 1000 illustrated in FIG. 10. In some examples, the process 1400 may be carried out by any suitable apparatus or means for carrying out the functions or algorithm described below.

At block 1402, in an aspect, the first device 1000 may transmit, to the second device, a first transmit configuration indicator (TCI) indicating the first transmit spatial configuration of the first device 1000. For example, the spatial configuration circuitry 1040 shown and described above in connection with FIG. 10 may provide means for transmitting the first TCI.

At block 1404, the first device 1000 may transmit, to a second device, a signal using a first transmit spatial configuration of the first device 1000. For example, the spatial configuration circuitry 1040 shown and described above in connection with FIG. 10 may provide means for configuring the first device 1000 to transmit the signal. In an aspect, the second device may be configured to receive the signal using the first receive spatial configuration of the second device based on the first TCI.

At block 1406, the first device 1000 may receive, from the second device, a receive configuration indications (RCI) to indicate a first receive spatial configuration of the second device that corresponds to the first transmit spatial configuration of the first device 1000. For example, the RCI management circuitry 1042 shown and described above in connection with FIG. 10 may provide means for receiving the RC. In an aspect, the RCI may include one or more beam indexes respectively indicating one or more receive spatial configurations including the first receive spatial configuration.

At block 1408, the first device 1000 may receive, from the second device, a slot indication of one or more future time slots available for the second device to receive from the first device 1000 using at least one of the first receive spatial configuration respectively indicated by the RC. For example, the slot indication circuitry 1046 shown and described above in connection with FIG. 10 may provide means for receiving the slot indication.

At block 1410, in an aspect, the first device 1000 may receive, from the second device, a channel quality measurement corresponding to the first RC. For example, the communication management circuitry 1044 shown and described above in connection with FIG. 10 may provide means for receiving the channel quality measurement. In an aspect, the channel quality measurement may be based on at least one of a reference signal received power (RSRP) value, a reference signal received quality (RSRQ) value, a channel quality indicator (CQI), or a rank indicator (RI).

At block 1412, in an aspect, the first device 1000 may determine one or more transmission parameters based on the channel quality measurement. For example, the communication management circuitry 1044 shown and described above in connection with FIG. 10 may provide means for determining the one or more transmission parameters.

At block 1414, the first device 1000 may transmit, to the second device, a communication on the one or more future slots using the first transmit spatial configuration of the first device 1000. For example, the communication management circuitry 1044 shown and described above in connection with FIG. 10 may provide means for transmitting the communication on the one or more future slots.

At block 1416, in an aspect, the first device 1000 may receive, from the second device, a beam correspondence indication to indicate that the second device supports beam correspondence to form a transmit beam that corresponds to a first receive beam identified by the RC. For example, the communication management circuitry 1044 shown and described above in connection with FIG. 10 may provide means for receiving the beam correspondence indication.

At block 1418, in an aspect, the first device 1000 may receive a transmission from the second device using a first receive spatial configuration of the first device 1000 that corresponds to the transmit beam of the second device. For example, the communication management circuitry 1044 shown and described above in connection with FIG. 10 may provide means for receiving the transmission.

In one configuration, the first device 1000 for wireless communication includes means for transmitting, to a second device, a signal using a first transmit spatial configuration of the first device 1000, means for receiving, from the second device, a receive configuration indication (RCI) to indicate a first receive spatial configuration of the second device that corresponds to the first transmit spatial configuration of the first device 1000, means for receiving, from the second device, a slot indication of one or more future time slots available for the second device to receive from the first device 1000 using at least one of the first receive spatial configuration respectively indicated by the RCI, and means for transmitting, to the second device, a communication on the one or more future slots using the first transmit spatial configuration of the first device 1000.

In an aspect, the first device 1000 may further include means for transmitting, to the second device, a first transmit configuration indicator (TCI) indicating the first transmit spatial configuration of the first device 1000. In an aspect, the first device 1000 may further include means for receiving, from the second device, a channel quality measurement corresponding to the RCI, and means for determining one or more transmission parameters based on the channel quality measurement. In an aspect, the first device 1000 may further include means for receiving, from the second device, a beam correspondence indication to indicate that the second device supports beam correspondence to form a transmit beam that corresponds to a first receive beam identified by the RCI, and means for receiving, from the second device, a beam correspondence indication to indicate that the second device supports beam correspondence to form a transmit beam that corresponds to a first receive beam identified by the RCI.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-3, 5-8 and/or 9, and utilizing, for example, the processes and/or algorithms described herein in relation to FIGS. 13 and/or 14.

The following provides an overview of several aspects of the present disclosure.

Aspect 1: A method of wireless communication by a first device, comprising: configuring the first device to receive, from a second device, a signal using a first receive spatial configuration of the first device that corresponds to a first transmit spatial configuration of the second device, determining a first receive configuration indicator (RCI) to indicate the first receive spatial configuration of the first device, and transmitting the first RCI to the second device.

Aspect 2: The method of aspect 1, further comprising: receiving, from the second device, a first transmit configuration indicator (TCI) indicating the first transmit spatial configuration of the second device, wherein the first device is configured to receive the signal using the first receive spatial configuration based on the first TCI.

Aspect 3: The method of aspect 1 or 2, wherein the first RCI includes one or more beam indexes respectively indicating one or more receive spatial configurations including the first receive spatial configuration.

Aspect 4: The method of any of aspects 1-3, further comprising: transmitting, to the second device, a slot indication of one or more future time slots available for the first device to communicate using the first receive spatial configuration indicated by the first RCI, and receiving a transmission from the second device on the one or more future slots using the first receive spatial configuration.

Aspect 5: The method of any of aspects 1-4, further comprising: transmitting, to the second device, a channel quality measurement corresponding to the first RCI, wherein the transmission from the second device is based on one or more transmission parameters determined based on the channel quality measurement.

Aspect 6: The method of aspect 5, wherein the channel quality measurement is based on at least one of a reference signal received power (RSRP) value, a reference signal received quality (RSRQ) value, a channel quality indicator (CQI), or a rank indicator (RI).

Aspect 7: The method of any of aspects 1-6, further comprising: transmitting, to the second device, a beam correspondence indication to indicate that the first device supports beam correspondence to form a transmit beam that corresponds to a first receive beam identified by the first RCI.

Aspect 8: The method of any of aspects 1-7, further comprising: transmitting, to one or more other devices, a slot indication of one or more future time slots available for the first device to communicate using the first receive spatial configuration indicated by the first RCI, and receiving a transmission from at least one of the one or more other devices on the one or more future slots using the first receive spatial configuration.

Aspect 9: The method of aspect 8, wherein the slot indication of one or more future time slots is transmitted via at least one of a broadcast transmission or a groupcast transmission.

Aspect 10: The method of any of aspects 1-9, further comprising: transmitting, to one or more other devices, a sidelink communication to one or more devices using a second transmit spatial configuration of the first device, wherein the sidelink communication includes: a second transmit configuration indicator (TCI) of the first device, wherein the second TCI indicates the second transmit spatial configuration of the first device, and a beam correspondence indication to indicate that the first device is capable of beam correspondence to form a receive beam that corresponds to the transmit beam indicated by the second TCI.

Aspect 11: The method of aspect 10, further comprising: transmitting a slot indication of one or more future time slots available for the first device to communicate using a second receive spatial configuration that has a beam correspondence to the second TCI of the first device, and receiving a transmission from at least one of the one or more devices on the one or more future slots using the second receive spatial configuration that corresponds to the second transmit spatial configuration indicated by the second TCI.

Aspect 12: The method of aspect 11, wherein the slot indication of one or more future time slots is transmitted via at least one of a broadcast transmission or a groupcast transmission.

Aspect 13: A first device comprising: a transceiver configured to communicate with a radio access network, a memory, and a processor communicatively coupled to the transceiver and the memory, wherein the processor and the memory are configured to perform any one of aspects 1 through 12.

Aspect 14: A first device configured for wireless communication comprising at least one means for performing any one of aspects 1 through 12.

Aspect 15: A non-transitory processor-readable storage medium having instructions for a first device thereon, wherein the instructions, when executed by a processing circuit, cause the processing circuit to perform any one of aspects 1 through 12.

Aspect 16: A method of wireless communication by a first device, comprising: transmitting, to a second device, a signal using a first transmit spatial configuration of the first device, receiving, from the second device, one or more first receive configuration indications (RCIs) to respectively indicate a first receive spatial configuration of the second device that correspond to the first transmit spatial configuration of the first device, receiving, from the second device, a slot indication of one or more future time slots available for the second device to receive from the first device using at least one of the first receive spatial configuration respectively indicated by the first RCI, and transmitting, to the second device, a communication on the one or more future slots using the first transmit spatial configuration of the first device.

Aspect 17: The method of aspect 16, further comprising: transmitting, to the second device, a first transmit configuration indicator (TCI) indicating the first transmit spatial configuration of the first device, wherein the second device is configured to receive the signal using the first receive spatial configuration of the second device based on the first TCI.

Aspect 18: The method of aspect 16 or 17, wherein the first RCI includes one or more beam indexes respectively indicating one or more receive spatial configurations including the first receive spatial configuration.

Aspect 19: The method of any of aspects 16-18, further comprising: receiving, from the second device, a channel quality measurement corresponding to the first RCI, and determining one or more transmission parameters based on the channel quality measurement, wherein the communication is transmitted based on the one or more transmission parameters.

Aspect 20: The method of aspect 19, wherein the channel quality measurement is based on at least one of a reference signal received power (RSRP) value, a reference signal received quality (RSRQ) value, a channel quality indicator (CQI), or a rank indicator (RI).

Aspect 21: The method of any of aspects 16-20, further comprising: receiving, from the second device, a beam correspondence indication to indicate that the second device supports beam correspondence to form a transmit beam that corresponds to a first receive beam identified by the first RCI, and receiving a transmission from the second device using a first receive spatial configuration of the first device that corresponds to the transmit beam of the second device.

Aspect 22: A first device comprising: a transceiver configured to communicate with a radio access network, a memory, and a processor communicatively coupled to the transceiver and the memory, wherein the processor and the memory are configured to perform any one of aspects 16 through 21.

Aspect 23: A first device configured for wireless communication comprising at least one means for performing any one of aspects 16 through 21.

Aspect 24: A non-transitory processor-readable storage medium having instructions for a first device thereon, wherein the instructions, when executed by a processing circuit, cause the processing circuit to perform any one of aspects 16 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a first device, comprising:

configuring the first device to receive, from a second device, a signal using a first receive spatial configuration of the first device that corresponds to a first transmit spatial configuration of the second device;

determining a receive configuration indicator (RCI) to indicate the first receive spatial configuration of the first device;

transmitting the RCI to the second device;

transmitting a sidelink communication to one or more devices using a second transmit spatial configuration of the first device, wherein the sidelink communication includes:

a second transmit configuration indicator (TCI) of the first device, wherein the second TCI indicates the second transmit spatial configuration of the first device, and a beam correspondence indication to indicate that the first device is capable of beam correspondence to form a receive beam that corresponds to a transmit beam indicated by the second TCI;

transmitting a slot indication of one or more future time slots available for the first device to communicate using a second receive spatial configuration that has a beam correspondence to the second TCI of the first device; and receiving a transmission from at least one of the one or more devices on the one or more future slots using the second receive spatial configuration that corresponds to the second transmit spatial configuration indicated by the second TCI.

2. The method of claim 1, further comprising:

receiving, from the second device, a first transmit configuration indicator (TCI) indicating the first transmit spatial configuration of the second device, wherein the first device is configured to receive the signal using the first receive spatial configuration based on the first TCI.

3. The method of claim 1, wherein the RCI includes one or more beam indexes respectively indicating one or more receive spatial configurations including the first receive spatial configuration.

4. The method of claim 1, further comprising:

transmitting, to the second device, a slot indication of one or more future time slots available for the first device to communicate using the first receive spatial configuration indicated by the RCI; and receiving a transmission from the second device on the one or more future slots using the first receive spatial configuration.

5. The method of claim 4, further comprising:

transmitting, to the second device, a channel quality measurement corresponding to the RCI, wherein the transmission from the second device is based on one or more transmission parameters determined based on the channel quality measurement.

6. The method of claim 5, wherein the channel quality measurement is based on at least one of a reference signal received power (RSRP) value, a reference signal received quality (RSRQ) value, a channel quality indicator (CQI), or a rank indicator (RI).

7. The method of claim 1, further comprising:

transmitting, to the second device, a beam correspondence indication to indicate that the first device supports beam correspondence to form a transmit beam that corresponds to a first receive beam identified by the RCI.

8. The method of claim 1, further comprising:

transmitting, to one or more other devices, a slot indication of one or more future time slots available for the first device to communicate using the first receive spatial configuration indicated by the RCI; and receiving a transmission from at least one of the one or more other devices on the one or more future slots using the first receive spatial configuration.

9. The method of claim 8, wherein the slot indication of one or more future time slots is transmitted via at least one of a broadcast transmission or a groupcast transmission.

10. The method of claim 1, wherein the slot indication of one or more future time slots is transmitted via at least one of a broadcast transmission or a groupcast transmission.

11. A first wireless device for wireless communication, comprising:

at least one processor;

a transceiver communicatively coupled to the at least one processor; and a memory communicatively coupled to the at least one processor, wherein the at least one processor is configured to:

configure the first device to receive, from a second device, a signal using a first receive spatial configuration of the first device that corresponds to a first transmit spatial configuration of the second device;

determine a receive configuration indicator (RCI) to indicate the first receive spatial configuration of the first device;

transmit the RCI to the second device;

transmit a sidelink communication to one or more devices using a second transmit spatial configuration of the first device, wherein the sidelink communication includes:

a second transmit configuration indicator (TCI) of the first device, wherein the second TCI indicates the second transmit spatial configuration of the first device, and a beam correspondence indication to indicate that the first device is capable of beam correspondence to form a receive beam that corresponds to a transmit beam indicated by the second TCI;

transmit a slot indication of one or more future time slots available for the first device to communicate using a second receive spatial configuration that has a beam correspondence to the second TCI of the first device; and receive a transmission from at least one of the one or more devices on the one or more future slots using the second receive spatial configuration that corresponds to the second transmit spatial configuration indicated by the second TCI.

12. The first wireless device of claim 11, wherein the at least one processor is further configured to:

receive, from the second device, a first transmit configuration indicator (TCI) indicating the first transmit spatial configuration of the second device, wherein the first device is configured to receive the signal using the first receive spatial configuration based on the first TCI.

13. The first wireless device of claim 11, wherein the at least one processor is further configured to:

transmit, to the second device, a slot indication of one or more future time slots available for the first device to communicate using the first receive spatial configuration indicated by the RCI; and receive a transmission from the second device on the one or more future slots using the first receive spatial configuration.

14. The first wireless device of claim 13, wherein the at least one processor is further configured to:

transmit, to the second device, a channel quality measurement corresponding to the RCI, wherein the transmission from the second device is based on one or more transmission parameters determined based on the channel quality measurement.

15. The first wireless device of claim 14, wherein the channel quality measurement is based on at least one of a reference signal received power (RSRP) value, a reference signal received quality (RSRQ) value, a channel quality indicator (CQI), or a rank indicator (RI).

16. The first wireless device of claim 11, wherein the at least one processor is further configured to:

transmit, to the second device, a beam correspondence indication to indicate that the first device supports beam correspondence to form a transmit beam that corresponds to a first receive beam identified by the RCI.

17. The first wireless device of claim 11, wherein the at least one processor is further configured to:

transmit, to one or more other devices, a slot indication of one or more future time slots available for the first device to communicate using the first receive spatial configuration indicated by the RCI; and receive a transmission from at least one of the one or more other devices on the one or more future slots using the first receive spatial configuration.

18. The first wireless device of claim 11, wherein the RCI includes one or more beam indexes respectively indicating one or more receive spatial configurations including the first receive spatial configuration.

19. A method of wireless communication by a first device, comprising:

transmitting, to a second device, a signal using a first transmit spatial configuration of the first device;

receiving, from the second device, a receive configuration indication (RCI) to indicate a first receive spatial configuration of the second device that corresponds to the first transmit spatial configuration of the first device;

receiving, from the second device, a slot indication of one or more future time slots available for the second device to receive from the first device using at least one of the first receive spatial configuration respectively indicated by the RCI;

transmitting, to the second device, a communication on the one or more future slots using the first transmit spatial configuration of the first device;

receiving, from the second device, a sidelink communication using a second receive spatial configuration of the first device, wherein the sidelink communication includes:

a second transmit configuration indicator (TCI) of the second device, wherein the second TCI indicates a second transmit spatial configuration of the second device, and a beam correspondence indication to indicate that the second device is capable of beam correspondence to form a receive beam that corresponds to a transmit beam indicated by the second TCI;

receiving, from the second device, a slot indication of one or more future time slots available for the second device to communicate using a second receive spatial configuration that has a beam correspondence to the second TCI of the second device; and transmitting a transmission to the second device on the one or more future slots using the second receive spatial configuration that corresponds to the second transmit spatial configuration indicated by the second TCI.

20. The method of claim 19, further comprising:

transmitting, to the second device, a first transmit configuration indicator (TCI) indicating the first transmit spatial configuration of the first device, wherein the second device is configured to receive the signal using the first receive spatial configuration of the second device based on the first TCI.

21. The method of claim 19, wherein the RCI includes one or more beam indexes respectively indicating one or more receive spatial configurations including the first receive spatial configuration.

22. The method of claim 19, further comprising:

receiving, from the second device, a channel quality measurement corresponding to the RCI; and determining one or more transmission parameters based on the channel quality measurement, wherein the communication is transmitted based on the one or more transmission parameters.

23. The method of claim 22, wherein the channel quality measurement is based on at least one of a reference signal received power (RSRP) value, a reference signal received quality (RSRQ) value, a channel quality indicator (CQI), or a rank indicator (RI).

24. The method of claim 19, further comprising:

receiving, from the second device, a beam correspondence indication to indicate that the second device supports beam correspondence to form a transmit beam that corresponds to a first receive beam identified by the RCI; and receiving a transmission from the second device using a first receive spatial configuration of the first device that corresponds to the transmit beam of the second device.

25. A first wireless device for wireless communication, comprising:

at least one processor;

a transceiver communicatively coupled to the at least one processor; and a memory communicatively coupled to the at least one processor, wherein the at least one processor is configured to:

transmit, to a second device, a signal using a first transmit spatial configuration of the first device;

receive, from the second device, a receive configuration indication (RCI) to indicate a first receive spatial configuration of the second device that corresponds to the first transmit spatial configuration of the first device;

receive, from the second device, a slot indication of one or more future time slots available for the second device to receive from the first device using at least one of the first receive spatial configuration respectively indicated by the RCI; and transmit, to the second device, a communication on the one or more future slots using the first transmit spatial configuration of the first device;

receive, from the second device, a sidelink communication using a second receive spatial configuration of the first device, wherein the sidelink communication includes:

a second transmit configuration indicator (TCI) of the second device, wherein the second TCI indicates a second transmit spatial configuration of the second device, and a beam correspondence indication to indicate that the second device is capable of beam correspondence to form a receive beam that corresponds to a transmit beam indicated by the second TCI;

receive, from the second device, a slot indication of one or more future time slots available for the second device to communicate using a second receive spatial configuration that has a beam correspondence to the second TCI of the second device; and transmit a transmission to the second device on the one or more future slots using the second receive spatial configuration that corresponds to the second transmit spatial configuration indicated by the second TCI.

26. The first device of claim 25, wherein the at least one processor is further configured to:

transmit, to the second device, a first transmit configuration indicator (TCI) indicating the first transmit spatial configuration of the first device, wherein the second device is configured to receive the signal using the first receive spatial configuration of the second device based on the first TCI.

27. The first device of claim 25, wherein the at least one processor is further configured to:

receive, from the second device, a channel quality measurement corresponding to the RCI; and determine one or more transmission parameters based on the channel quality measurement, wherein the communication is transmitted based on the one or more transmission parameters.

28. The first device of claim 27, wherein the channel quality measurement is based on at least one of a reference signal received power (RSRP) value, a reference signal received quality (RSRQ) value, a channel quality indicator (CQI), or a rank indicator (RI).

29. The first device of claim 25, wherein the at least one processor is further configured to:

receive, from the second device, a beam correspondence indication to indicate that the second device supports beam correspondence to form a transmit beam that corresponds to a first receive beam identified by the RCI; and receive a transmission from the second device using a first receive spatial configuration of the first device that corresponds to the transmit beam of the second device.

30. The first device of claim 25, wherein the RCI includes one or more beam indexes respectively indicating one or more receive spatial configurations including the first receive spatial configuration.

* * * * *